United States Patent [19]

Nagata et al.

[11] Patent Number: 5,573,129
[45] Date of Patent: Nov. 12, 1996

[54] COLLAPSIBLE CONTAINER FOR A LIQUID

[75] Inventors: Masayoshi Nagata; Satoshi Hori; Mishi Gomori; Nobuyoshi Yoshida, all of Kanagawa, Japan

[73] Assignee: Fuji Photo Film Co., Ltd., Kanagawa, Japan

[21] Appl. No.: 199,343

[22] Filed: Feb. 18, 1994

[30] Foreign Application Priority Data

Feb. 19, 1993 [JP] Japan ................... 5-030664
Jun. 14, 1993 [JP] Japan ................... 5-142394
Jun. 14, 1993 [JP] Japan ................... 5-142399

[51] Int. Cl.⁶ .................. B65D 1/02; B65D 1/32; B65D 25/14
[52] U.S. Cl. .................. 215/382; 215/900; 220/666; 220/669; 220/672
[58] Field of Search ................ 215/1 C, 581, 215/382, 900; 220/666, 672, 673, 669, 675, 606, 907; 222/95, 107, 215

[56] References Cited

U.S. PATENT DOCUMENTS

| | | | |
|---|---|---|---|
| 2,857,080 | 10/1958 | Elias | 222/215 |
| 3,083,877 | 4/1963 | Gash | 220/666 X |
| 3,143,429 | 8/1964 | Swanson et al. | 222/215 X |
| 3,270,905 | 9/1966 | Kroekel | 220/666 X |
| 3,301,293 | 1/1967 | Santelli | 215/1 CX |
| 4,377,191 | 3/1983 | Yamaguchi | 220/667 |
| 4,394,906 | 7/1983 | Hollenbeck | 222/107 |
| 4,492,313 | 1/1985 | Touzani | 215/1 C |
| 4,526,296 | 7/1985 | Berger et al. | 220/107 |
| 4,775,564 | 10/1988 | Shriver et al. | 220/666 X |
| 4,790,361 | 12/1988 | Jones et al. | 215/1 CX |
| 4,887,730 | 12/1989 | Touzani | 215/1 CX |
| 4,921,147 | 1/1990 | Poirier | 220/666 X |
| 4,955,493 | 9/1990 | Touzani | 215/1 CX |
| 5,027,963 | 7/1991 | Robbins, III | 220/666 X |
| 5,348,173 | 9/1994 | Norwood | 220/666 X |

FOREIGN PATENT DOCUMENTS

| | | |
|---|---|---|
| 0287170 | 10/1988 | European Pat. Off. ............... 215/1 C |
| 0445774 | 9/1991 | European Pat. Off. . |
| 2607109 | 5/1988 | France . |
| 4102544 | 4/1992 | Japan ................ 220/666 |
| 2250259 | 6/1992 | Japan ................ 220/666 |
| 586133 | 3/1977 | Switzerland . |
| 558915 | 4/1960 | United Kingdom . |
| 8802726 | 4/1988 | WIPO . |
| 8805014 | 7/1988 | WIPO . |

*Primary Examiner*—Sue A. Weaver
*Attorney, Agent, or Firm*—Sughrue, Mion, Zinn, Macpeak & Seas

[57] ABSTRACT

A container is formed for a liquid. In order to reduce a volume of the container for a liquid after use thereof, a bellows portion is provided at an axial direction portion of a container main body. A lid member is removed, and liquid within the container for a liquid is discharged from an opening portion. The bellows portion is contracted so that head space can be adjusted and so that a volume of the container main body can be reduced. Further, because the head space can be adjusted, an interior of the container for a liquid is always substantially filled with the liquid so that oxidation of the liquid can be prevented. When the liquid is poured, the bellows portion automatically expands and contracts so that the liquid flows quickly and so that little air is drawn in. Further, if a certain amount or more of the liquid in the interior is discharged, the volume can be reduced, and a volume-reduced state can be maintained by tightly screwing the lid member. When the bellows portion is expanded, the container for a liquid is easy to hold as there are convex and concave portions at the bellows portion.

8 Claims, 20 Drawing Sheets

COLLAPSIBLE CONTAINER FOR A LIQUID

BACKGROUND OF THE INVENTION

1. Field of the Invention

The present invention relates to a container for a liquid, and more specifically, to a container for a liquid which is suitable for use as a container for a processing solution which is used in developing processing of a photosensitive material.

2. Description of the Prior Art

Photosensitive material processing apparatuses such as automatic developing apparatuses have used rigid containers for liquids which are formed by blow molding or injection blow molding and by using a single-layer material such as high density polyethylene (HDPE), polyvinylchloride resin (PVC) or polyethylene terephthalate (PET) or a multi-layer material such as nylon/polyethylene (NY/PE). These materials are used as they are suitable for the self-supportability of the container (i.e., the ability of the container to stand alone without external support) and because they are suitable for the filling of the container with liquid at a factory and for the pouring of the liquid into a processing tank, thereby facilitating use of the container. Further, these materials are used because they guarantee the strength required by UN regulations (regulations for the transport of exported dangerous substances, i.e., legal regulations considering the drop strength at −18° C.) as well as regulations for poisonous substances.

However, even when the contents of such a conventional, rigid container for a liquid have been discharged and the container is empty, the container retains its configuration due to the rigidity thereof. Therefore, it is difficult for a user to crush the container after the container has been used and is to be discarded. A drawback arises in that the used containers occupy a relatively large amount of space.

Recently, blow-molded containers have been developed in which a bellows portion is provided at a trunk portion of the container so that the container can be collapsed by being pressed. In accordance with such collapsible, blow-molded containers, the collapsed state can be maintained by tightly closing a cap when the container is collapsed. Therefore, the collection efficiency improves when the containers are collected with the caps fastened thereto.

However, with such conventional blow-molded containers, there is a drawback in that it is easy for the container to return to its original configuration when the cap is removed therefrom.

in recent years, as more consideration has been given to using limited natural resources more efficiently, blow-molded containers have been reused as material for resin manufactured products. When used containers are collected for reuse, it is usually necessary to separately collect the cap and the container, which are formed of different resin materials, but deterioration of the collection efficiency should be kept to a minimum. In order to achieve this object of efficient reuse, the inventors of the present invention have trial manufactured various types of containers having bellows portions of various cross sectional configurations, and have found that it is difficult for a gradually-widening container, which has a bellows portion with a circular cross section and in which the diameter of the bellows portions gradually increases from top to bottom, to return to its original configuration.

In the case of containers for photographic processing solutions, a plurality of containers for processing solutions which are filled with the same type of processing solution are packed in a corrugated fiberboard box or the like, or containers for processing solutions which are filled with different types of processing solutions such as developing solution, fixing solution, bleaching solution and the like are packed in the same corrugated fiberboard box, and are shipped from the manufacturer and distributed. However, when the above-described circular, gradually-widening containers are packed in boxes, a drawback arises in that there is wasted space between the containers and the packing efficiency is insufficient.

SUMMARY OF THE INVENTION

A main object of the present invention is to provide a container for a liquid whose volume can easily be reduced, i.e., the necessary space can be reduced, after use thereof without adversely effecting the ease of use of the container for a liquid.

Another object of the present invention is to provide a container for a liquid which does not easily return to its original configuration after the volume thereof has been reduced.

Further, yet another object of the present invention is to provide a container for a liquid for a photographic processing material in which collecting efficiency and packing efficiency can be improved when the container and a cap are collected separately.

The container for a liquid of the present invention includes a flexible container main body having a bellows portion at at least an axial direction portion of said container main body, and a rigid opening portion formed integrally with said container main body so as to protrude from said container main body in an axial direction, said opening portion being opened and closed by a lid member which engages with said opening portion. In accordance with this structure, because the bellows portion is formed at at least a portion of the flexible container main body in the axial direction thereof, the container main body expands and contracts in accordance with an external force when the lid member has been removed. As a result, the volume can be easily reduced by contracting the bellows portion. Further, because the bellows portion automatically expands and contracts during pouring of the liquid, the liquid is poured smoothly.

An outer tube may be attached to the outer periphery of the bellows portion of the container for a liquid of the present invention so that the self-supportability of the container main body can be ensured by the outer tube. In this case, the container main body itself may be self-supportable or not. It is preferable that the container main body is not self-supportable in so far as the volume thereof can be reduced easily.

Further, in the container for a liquid of the present invention, the bellows portion may be provided continuously to the border portion of the opening portion and the container main body. In this way, the volume can be reduced even further by contracting the entire bellows portion.

In the container for a liquid of the present invention, said bellows portion may be formed of a plurality of annular convex portions and band-shaped annular connecting portions, said plurality of annular convex portions being disposed at predetermined intervals along the axial direction of said container main body and respectively having, at an intermediate portion thereof in the axial direction, an annular maximum protruding portion which protrudes a maximum amount from a central axis in a direction orthogonal to the axial direction, and said band-shaped annular connecting portions connecting said annular convex portions, which are adjacent, at minimum protruding portions which protrude a minimum amount in the direction orthogonal to the axial direction of both axial direction ends of said annular convex portions. Because the annular connecting portions are formed during blow molding so as to be thicker than the annular convex portions, the self-supportability and self-maintainability of the container for a liquid can be ensured, and the volume thereof can be easily reduced.

Further, in the container for a liquid of the present invention, an R portion may be formed at each of said annular convex portions at one of one axial direction side of the annular maximum protruding portion and another axial direction side of the annular maximum protruding portion. Accordingly, compared with a case in which no R portions are formed, it is difficult for the container for a liquid to return to its original configuration after the volume thereof is reduced.

In the container for a liquid of the present invention, it suffices to not provide the band-shaped annular connecting portions and to form the bellows portion from only a plurality of annular convex portions which are disposed at predetermined intervals along the axial direction of the container main body, and that the axial direction ends of the respective annular convex portions are connected to each other at portions nearest to the central axis. In this case, it is preferable that the thickness of the connecting portions nearest to the central axis is greater than the thickness of the portions which are furthest from the central axis. It is desirable that the ratio of these thicknesses is about 1.1 to 5.0. Further, during regular blow molding, parison control may be used to adjust the thicknesses such that the thickness of the connecting portions nearest to the central axis is greater than the thickness of the portions which are furthest from the central axis.

It is preferable that R portions be formed at each annular convex portion at the upper side and the lower side respectively of the maximum protruding portion which protrudes the furthest in the direction orthogonal to the axial direction, and that the respective radii of curvature of the R portions are different. Further, from the standpoint of improving the collapsing efficiency and the like, it is preferable to form concave grooves in each annular convex portion along the entire periphery of the upper side or the lower side of the maximum protruding portion which protrudes the most in the direction orthogonal to the axis.

In the container for a photographic processing composition relating to the present invention, the bellows portion includes a plurality of annular convex portions whose cross sections orthogonal to the axis are substantially rectangular. The annular convex portions are disposed at predetermined intervals along the axial direction of the container main body and have, at intermediate portions thereof in the axial direction, annular maximum protruding portions which have the same size and the same configuration so as to be set in a superposed arrangement when viewed from the axial direction. Therefore, when a plurality of the containers for a photographic processing composition are packed in a box, there is almost no dead space between the containers. Accordingly, the efficiency of packing the shipped containers for a photographic processing composition can be improved for distribution. Further, for each of the annular convex portions forming the bellows portion, the axial direction dimension of either the opening portion side of the annular maximum protruding portion or the side of the annular maximum protruding portion opposite to the opening portion is larger than the axial direction dimension of the other of the opening portion side and the side opposite thereto. Therefore, by pushing the opening portion in the axial direction, the portion at the other side of the annular maximum protruding portion of the annular convex portion caves in toward the one side and enters into the inner side of the one side portion of the annular maximum protruding portion. Accordingly, the container main body is compressed and the volume thereof is reduced, and after the volume is reduced, it is difficult for the container main body to return to its original configuration. The requisite collecting efficiency for the containers for a photographic processing composition can thereby be improved.

When the respective cross sections orthogonal to the axial direction of the annular convex portions and the annular connecting portions are formed as octagons in which substantially the same triangular portions are removed from the four corners of a rectangle, the difference between the distance from the central axis to the four corner portions and the distance from the central axis to the other portions is small. Therefore, during blow molding, it is easy for the resin to turn in at the four corner portions, and the thickness of the cross section orthogonal to the axis becomes more uniform, and it is even more difficult for the container to return to its original configuration after the volume thereof has been reduced.

DESCRIPTION OF THE PREFERRED EMBODIMENTS

Figure 2:
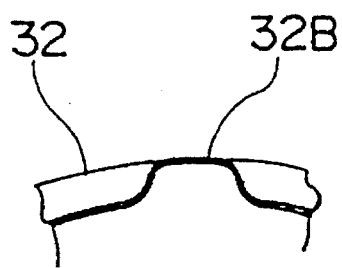
FIG. 2 is a sectional view taken along line 2—2 of FIG. 1.
Figure 3:
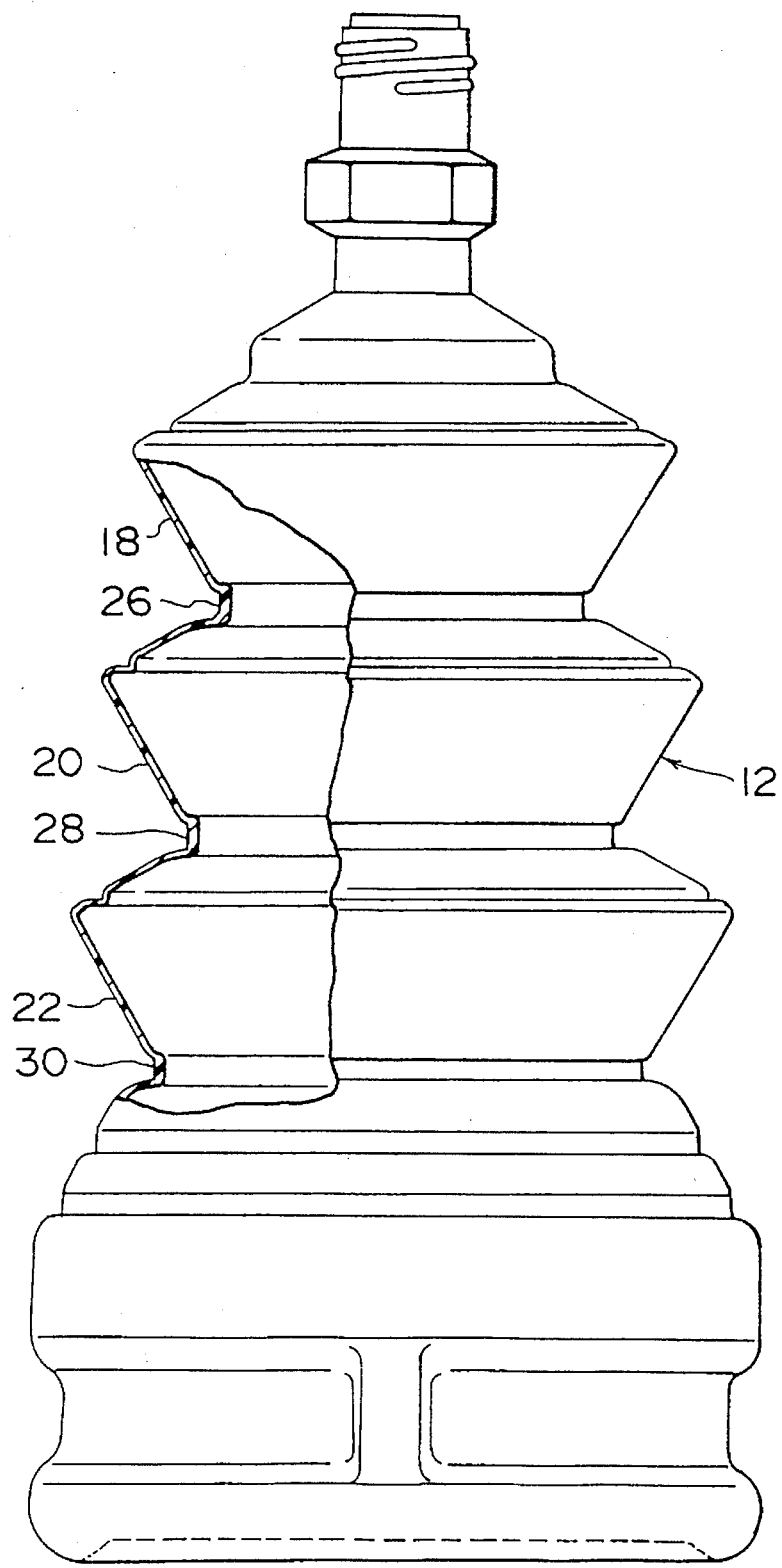
FIG. 3 is a front view in which the container for a liquid of FIG. 1 is partially broken.

Hereinafter, a first embodiment of the present invention will be described with reference to FIGS. 1 through 3.

Figure 1:
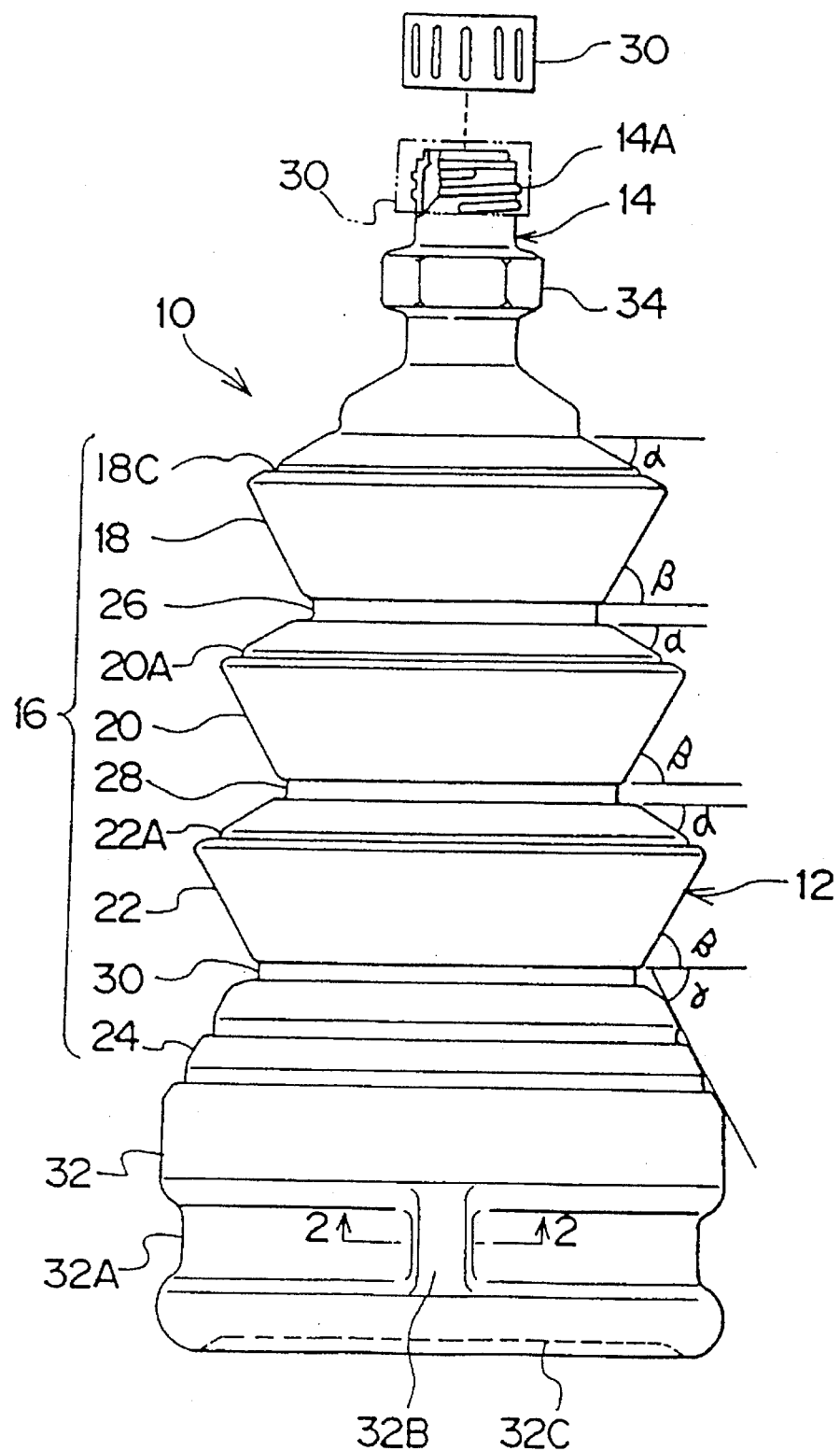
FIG. 1 is a front view in which a container for a liquid relating to a first embodiment of the present invention is partially broken.

A container for a liquid 10 of the embodiment illustrated in FIG. 1 has a flexible container main body 12 and a rigid opening portion 14 which projects from the container main body 12 in the axial direction thereof. The container main body 12 and the opening portion 14 are formed integrally by blow molding. The configuration of the container for a liquid 10 is substantially symmetrical to the left and right with respect to the vertical axis regardless of the direction from which the container for a liquid 10 is viewed.

A bellows portion 16 is formed so as to be continuous from the boundary between the container main body 12 and the opening portion 14 at substantially the upper ¾ of the container main body 12 in the axial direction (the vertical direction in FIG. 1). The bellows portion 16 includes first, second and third abacus bead shaped portions 18, 20, 22 and a stepped cylindrical portion 24. The first, second and third abacus bead shaped portions 18, 20, 22 serve as annular convex portions and are disposed at predetermined intervals in the vertical direction. The stepped cylindrical portion 24 is disposed beneath the third abacus bead shaped portion 22 and is separated therefrom by a predetermined distance. Here, "abacus bead shaped portion" means that each of the abacus bead shaped portions is structured such that the external configuration thereof is formed from two truncated cones which are set in mutually opposing directions (one oriented upward and the other oriented downward) and which share a central axis (here, the vertical axis) and a maximum diameter portion which is an annular maximum protruding portion which protrudes furthest outwardly in the direction orthogonal to the axial direction. Hereinafter, the term "abacus bead shaped portion" will be used to convey the same meaning. Accordingly, the maximum diameter portion, which is the annular maximum protruding portion, is positioned at an intermediate portion in the axial direction (i.e., the vertical direction in FIG. 1).

The first abacus bead shaped portion 18 and the second abacus bead shaped portion 20 are connected by a first cylindrical connecting portion 26, which serves as a band-shaped annular connecting portion, at the respective minimum protruding portions, which protrude the least in the direction orthogonal to the axis, of the axial direction ends of the first and second abacus bead shaped portions 18, 20. In the same way, the second abacus bead shaped portion 20 and the third abacus bead shaped portion 22 are connected by a second cylindrical connecting portion 28 which serves as a band-shaped annular connecting portion. Further, the third abacus bead shaped connecting portion 22 and the stepped cylindrical portion 24 are connected in the same way by a third cylindrical connecting portion 30.

First, second and third annular concave grooves 18C, 20A and 22A, whose respective central axes are the vertical axis, are formed at portions of the first, second and third abacus bead shaped portions 18, 20, 22, respectively, directly above the maximum diameter portions thereof. As will be described later, the annular concave grooves 18C, 20A, 22A serve as folds when the bellows portion 16 is contracted.

For each of the first, second and third abacus bead shaped portions 18, 20, 22, the axial direction (in FIG. 1, the vertical direction) length of the portion thereof above the maximum diameter portion is smaller than the axial direction length of the portion below the maximum diameter portion. Further, for each of the first, second and third abacus bead shaped portions 18, 20, 22, the angle formed by a horizontal plane and the inclined surface of the portion above the maximum diameter portion (i.e., the portion nearer to the opening portion 14) is substantially one-half of the angle formed by a horizontal plane and the inclined surface of the portion below the maximum diameter portion (i.e., the portion nearer to a base portion 32). More specifically, angle $\alpha$ in FIG. 1 is 30°, and angle $\beta$ is 60°. Further, angle $\gamma$, which is formed by a horizontal plane and an inclined plane connecting the outer peripheral surfaces of the stepped cylindrical portion 24, is substantially equal to the angle $\beta$ formed by a horizontal plane and the downwardly inclined surface of the maximum diameter portion of the third abacus bead shaped portion 22. The maximum diameter of the second abacus bead shaped portion 20 is larger than the maximum diameter of the first abacus bead shaped portion 18, and the maximum diameter of the third abacus bead shaped portion 22 is larger than that of the second abacus bead shaped portion 20. In the present embodiment, the sum of the respective maximum diameters of the first abacus bead shaped portion 18 and the third abacus bead shaped portion 22 is twice the length of the maximum diameter of the second abacus bead shaped portion 20. Because the respective portions of the bellows portion 16 of the container main body 12 are structured in this way, when the bellows portion 16 is contracted and the volume of the container main body 12 is reduced after processing solution has been discharged from the interior thereof as will be described later, the efficiency with which the container main body 12 can be folded in and collapsed can be improved.

As can be clearly seen in FIG. 1, the diameter of the first cylindrical connecting portion 26 is smaller than the diameter of the maximum diameter portion of the first abacus bead shaped portion 18. Therefore, during blow molding using a parison having a circular cross section, the first cylindrical connecting portion 26 is formed so as to be more thick than the first abacus bead shaped portion 18. Similarly, the second cylindrical connecting portion 28 is thicker than the second abacus bead shaped portion 20, and the third cylindrical connecting portion 30 is thicker than the third abacus bead shaped portion 22.

More specifically, the diameter of the first cylindrical connecting portion 26 is less than or equal to 85%, preferably 40 to 75%, and more preferably 50 to 75% of the diameter of the maximum diameter portion of the first abacus bead shaped portion 18. The relation between the second cylindrical connecting portion 28 and the second abacus bead shaped portion 20 is similar, as is the relation between the third cylindrical connecting portion 30 and the third abacus bead shaped portion 22. In this way, the collapsing efficiency can be improved even further, and the container for a liquid 10 can be prevented from returning to its original configuration.

As the ratio of the diameter of the cylindrical connecting portion and the diameter of the abacus shaped bead portion nears 100%, the difference in the amounts of protrusion thereof from the central axis in the direction orthogonal to the axis becomes smaller, and the groove formed therebetween becomes more shallow and the specific surface area of the container decreases. This is preferable in so far as the amount of permeating oxygen is decreased.

The base portion 32, which is substantially cylindrical, is provided beneath the stepped cylindrical portion 24. The diameter of the border portion between the base portion 32 and the stepped cylindrical portion 24 is approximately the same as the maximum diameter of the third abacus bead shaped portion 22. A small diameter portion 32A is formed at an intermediate portion of the base portion 32 in the axial direction. A pair of ribs 32B having a predetermined width are formed in the small diameter portion 32A along the axial direction at the front side of the surface of the paper on which FIG. 1 is illustrated and at the rear side thereof (in FIG. 1, only the rib at the front side of the surface of the paper is illustrated). As illustrated in FIG. 2, when the container for a liquid 10 is blow molded, the ribs 32B are formed by being protruded outwardly. The ribs 32B reinforce the base portion 32 and prevent crushing in the axial direction. A concave portion 32C is formed at the bottom surface of the base portion 32. The stability of the container for a liquid 10 when stood upright is improved by the concave portion 32C.

The opening portion 14 is substantially cylindrical. A flange portion 34 having a hexagonal cross section is formed at an intermediate portion of the opening portion 14 in the axial direction (the vertical direction in FIG. 1). The opening portion 14 is formed integrally with the container main body 12 by blow molding. At this time, the opening portion 14 can be formed so as to be more thick than the container main body 12 because the diameter of the opening portion 14 is smaller than the diameter of the container main body 12. As a result, the opening portion is formed so as to be rigid to a certain extent. The average thickness of the opening portion 14, the flange portion 34 and the opening base portion, which includes vicinities of the opening portion 14 and the flange portion 34, is preferably 0.5 mm to 4 mm, more preferably 0.5 mm to 3 mm, and most preferably 1.2 mm to 2.5 mm. It is preferable that the average thickness of the container main body 12 is 0.1 mm to 1.5 mm, more preferable that the thickness is 0.2 mm to 0.7 mm, and particularly preferable that the thickness is 0.3 mm to 0.5 mm. The difference between, on the one hand, the average thickness of the opening portion 14, the flange portion 34 and the opening base portion and, on the other hand, the average thickness of the container main body 12 is preferably 0.2 mm and more preferably 0.5 mm. Further, it is desirable that the ratio of the average thickness of the opening base portion and the average thickness of the main body portion is around 2.0 to 10.0. In this way, the entire weight of the container for a liquid 10 can be decreased without the usability thereof being adversely effected. (This will be described in further detail later.)

A male screw portion 14A is formed on the outer periphery of the upper end portion of the opening portion 14. The female screw portion which screws with the male screw portion 14A is formed on the inner wall of a cap 30 which is rigid and serves as a lid member. The cap 30 is screwed to the outer periphery of the upper end portion of the opening portion 14 so that the opening at the upper portion of the opening portion 14 can be opened and closed. The cap 30 is formed of, for example, polypropylene or high density polyethylene (HDPE). High density polyethylenes having a density of, for example, greater than 0.940 g/cc, preferably greater than 0.940 g/cc to less than or equal to 0.980 g/cc, and more preferably from 0.945 to 0.970 g/cc, can be used.

If gas barrier ability is required of the container for a liquid 10 due to the liquid filled therein, the requisite gas barrier ability can easily be obtained by changing the materials and raw materials used. For example, if the container for a liquid 10 is formed to be used for a liquid requiring a high $O_2$ barrier ability, such as developing solutions among processing solutions used for photography, the container for a liquid 10 may be formed of a multi-layer structure with low density polyethylene as the main body, such as a three-layer structure of low density polyethylene/ polyvinyl alcohol—ethylene copolymer/low density polyethylene (LDPE/EVOH/LDPE) or a two-layer structure of low density polyethylene/nylon (LDPE/NY) or the like. The gas barrier ability should be less than or equal to 25 ml/m$^2$.day.atm (20° C. 65%), and preferably 0.5 to 10 ml/m$^2$.day.atm (20° C. 65%).

On the other hand, if, for example, the container for a liquid 10 is formed to be used for a liquid which does not necessarily require $O_2$ barrier ability, such as fixing solution or the like, the container for a liquid 10 may be formed by using a low density polyethylene (LDPE) simple substance or ethylene—vinyl acetate copolymer resin (EVA; in this case, EVA with densities exceeding 0.940 g/cc can also be used). Low density polyethylenes having densities of less than or equal to 0.940 g/cc, preferably 0.90 g/cc to 0.940 g/cc, and more preferably 0.905 g/cc to 0.925 g/cc can be used. The gas barrier ability of the container for a liquid 10 in this case may be greater than or equal to 50 ml/m$^2$.day.atm (20° C. 65%), for example, 100 to 5000 ml/m$^2$.day.atm (20° C. 65%).

As described above, because low density polyethylene is used as the main body of the structure of the container for a liquid 10, the container for a liquid 10 is light-weight compared to conventional containers formed from high density polyethylene (HDPE).

In accordance with the container for a liquid 10 of the present embodiment structured as described above, the opening portion 14 is formed so as to be relatively rigid, and the flange portion 34 is hexagonal. Therefore, operations for filling the container for a liquid 10 with a processing solution such as developing solution, fixing solution or the like at a factory can be effected smoothly. Further, because the opening portion 14 is relatively rigid and the flange portion 34 is easy to hold, the main body portion 12 (which is flexible) is not twisted when the cap 30 is removed. As a result, it is difficult for drawbacks to occur such as the liquid, e.g., processing solution, within the container for a liquid 10 accidentally overflowing from the opening portion 14. However, because one of the distinguishing features of the container for a liquid 10 is that it is flexible, overflowing of liquid during filling and use of the container occurs easily as compared with conventional, rigid containers. Therefore, in order to prevent such drawbacks, it is desirable that the liquid filling rate is less than or equal to 95% and preferably about 95 to 85% of the volume of the container for a liquid 10 when the container for a liquid 10 is pulled in the axial direction such that the bellows portion 16 is extended as much as possible.

Because there are convex and concave portions in the bellows portion 16 and the annular connecting portions are thick, when the bellows portion 16 is extended, it is easy to handle. Further, when the user is pouring the processing solution into a processing tank, the bellows portion 16 automatically expands and contracts, and the flow of liquid is fast, and there is little drawing in of air. Therefore, handling during pouring is easy, and the liquid can be poured smoothly.

In the present embodiment, the first through the third cylindrical connecting portions 26, 28, 30, whose diameters are small and which are thicker than other portions forming the bellows portion 16, are provided at predetermined intervals. Therefore, the self-supportability of the container for a liquid 10 can be sufficiently ensured. Further, because the bellows portion 16 is formed at the container main body 12, when the cap 30 is removed and processing solution within the container for a liquid 10 is discharged from the opening portion 14, the opening portion 14 is pushed downward (toward the base portion 32) and the bellows portion 16 is contracted in accordance with the amount of discharged processing solution so that the head space (the amount of air space within the upper portion of the container where there is no processing solution) can be adjusted. Because the head space can be adjusted, the processing solution within the container for a liquid 10 can always be maintained in a substantially full state, and oxidation can be prevented.

Further, because the container for a liquid 10 is formed with low density polyethylene as the main body of the structure so as to be flexible, by firmly fastening the cap 30, the container for a liquid 10 can be closed even more reliably as compared with conventional containers formed of high density polyethylene or the like. If the container for a liquid 10 is accidentally dropped or the like while being used, it is difficult for the processing solution or the like within the container to leak out therefrom. Further, the amount of synthetic resin used is small as compared with conventional containers for liquids which are rigid and are formed from high density polyethylene (HDPE), polyvinylchloride resin (PVC) and the like. As a result, less heat is used when the container for a liquid 10 is incinerated after being disposed of, which contributes to the preservation of the environment.

Figure 4:
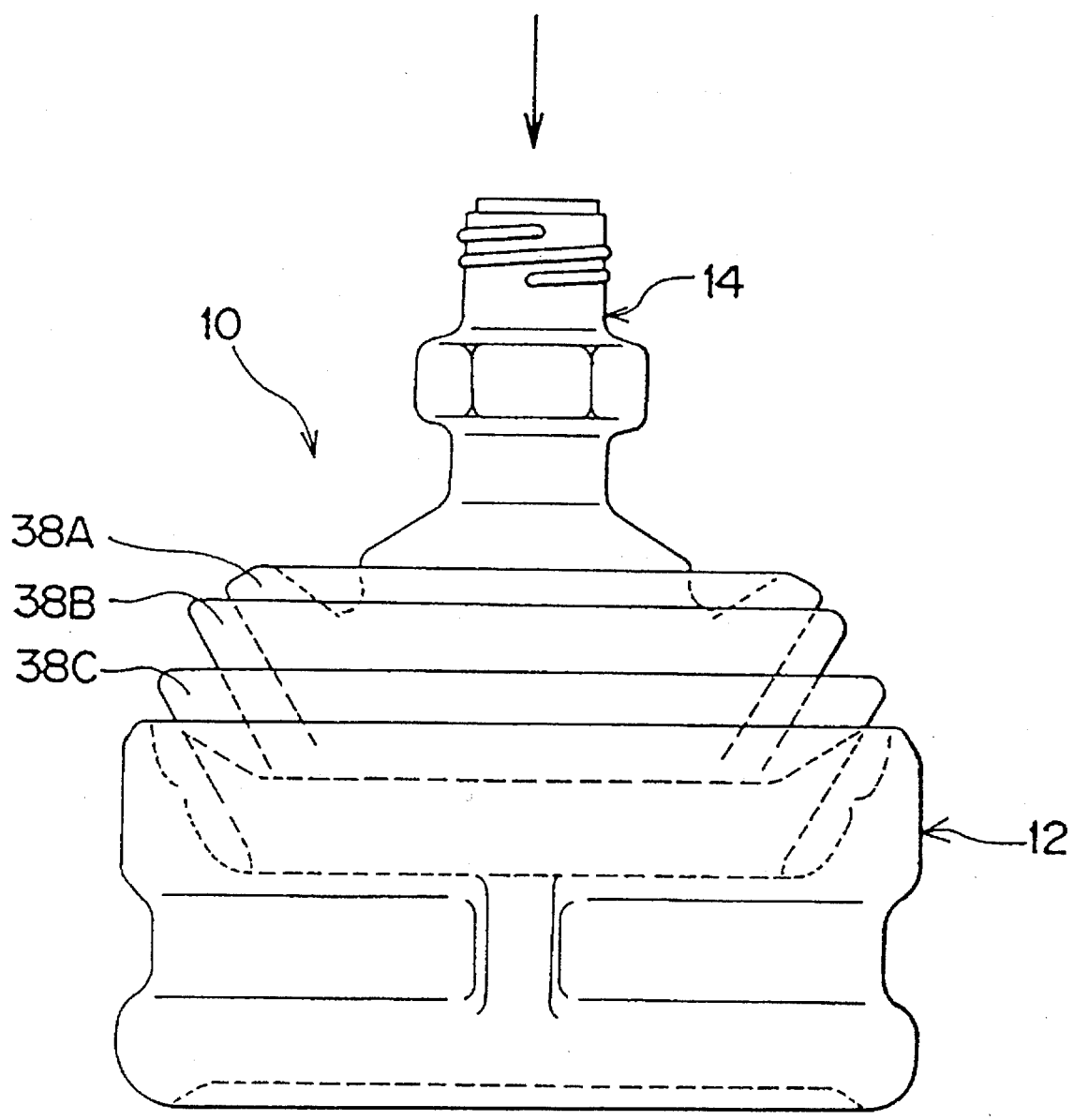
FIG. 4 is a front view illustrating a state in which the container for a liquid of FIG. 1 is in a volume-reduced state.

Moreover, if an amount greater than or equal to a given amount of the processing solution within the container for a liquid 10 (substantially the whole amount) is discharged, by pushing the opening portion 14 even further toward the bottom, the container for a liquid 10 deforms to the configuration illustrated in FIG. 4 so that further reduction of the volume of the container main body 12 is possible.

The pressure necessary to reduce the volume of the container of the present embodiment varies in accordance with the size of the container, but is preferably 1 to 20 kg/cm$^2$ and more preferably 5 to 10 kg/cm$^2$. For containers having a volume of one liter or more, the volume can be reduced preferably at pressures of 3 to 20 kg/cm$^2$ and more preferably 5 to 10 kg/cm$^2$. (The same holds for embodiments described hereinafter.)

By screwing the cap 30 on tightly after the volume of the container main body 12 has been reduced as illustrated in FIG. 4, this volume-reduced state can be maintained. Accordingly, the efficiency of collecting the discarded containers for a liquid 10 after use thereof can be improved.

It is desirable that the rate of volume reduction, which is the ratio between the volume in the state illustrated in FIG. 1 before the bellows portion 16 has been compressed to the volume in the state illustrated in FIG. 4 in which the bellows portion 16 is completely compressed, is less than or equal to 50%, preferably less than or equal to 40% and more preferably less than or equal to 30%. However, it is preferable that the rate of volume reduction is greater than or equal to 10% from the standpoints of manufacturing and design. Here, the rate of volume reduction is the ratio of volumes calculated by using the change in the height of the water surface when the container for a liquid 10 is closed by the cap 30 and is submerged in water.

The present embodiment describes an example in which the flange portion 34, which is formed so as to protrude from the intermediate portion of the opening portion 14 in the axial direction, is hexagonal. However, the flange portion 34 can be formed in other configurations such as a square, an octagon or a so-called oval shape. In other words, it suffices that the flange portion 34 is formed in a configuration in which one portion thereof is a flat surface. However, if the opening base portion between the flange portion 34 and the container main body 12 is formed so as to be long, this opening base portion can be held, and therefore, the flange portion 34 may be formed in a circular shape.

Figure 5:
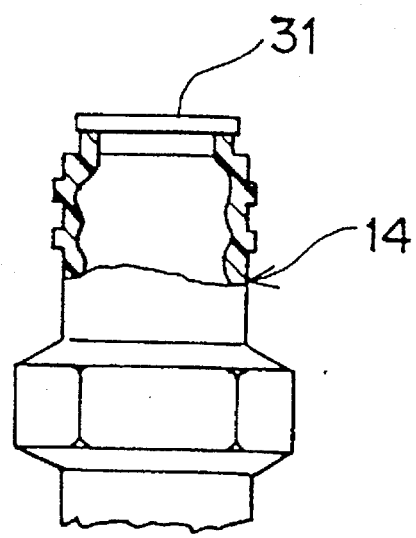
FIG. 5 is a front view in which an opening portion is partially broken in order to illustrate an inside lid.

Moreover, if an inside lid 31 such as that illustrated in FIG. 5 is used as the lid member instead of an external lid such as the cap 30, the inside lid 31 can be formed of the same low density polyethylene as the container for a liquid 10. This is preferable not only in terms of efficiency of production, but also with respect to the collection and reuse of the container. Further, by using both the inside lid 31 and the cap 30, the container for a liquid 10 can be closed even more securely so that it is even more difficult for leaks of the solution and the like to occur. Still further, a cap having a middle stopper, which is structured as if the inside lid 31 and the cap 30 were provided integrally, may be provided. In this case, the closing of the container for a liquid 10 can be ensured to the same extent as or an even greater extent than the structure in which the inside lid 31 and the cap 30 are both provided. The entire cap having a middle stopper can be formed from the same low density polyethylene as the container for a liquid 10, which, as described above, is preferable in terms of production efficiency as well as in light of the collection and reuse of the container.

Next, a variant example of the first embodiment will be described with reference to FIGS. 6 through 8. Structural parts which are the same as or similar to those of the first embodiment are denoted with the same reference numerals.

Figure 6:
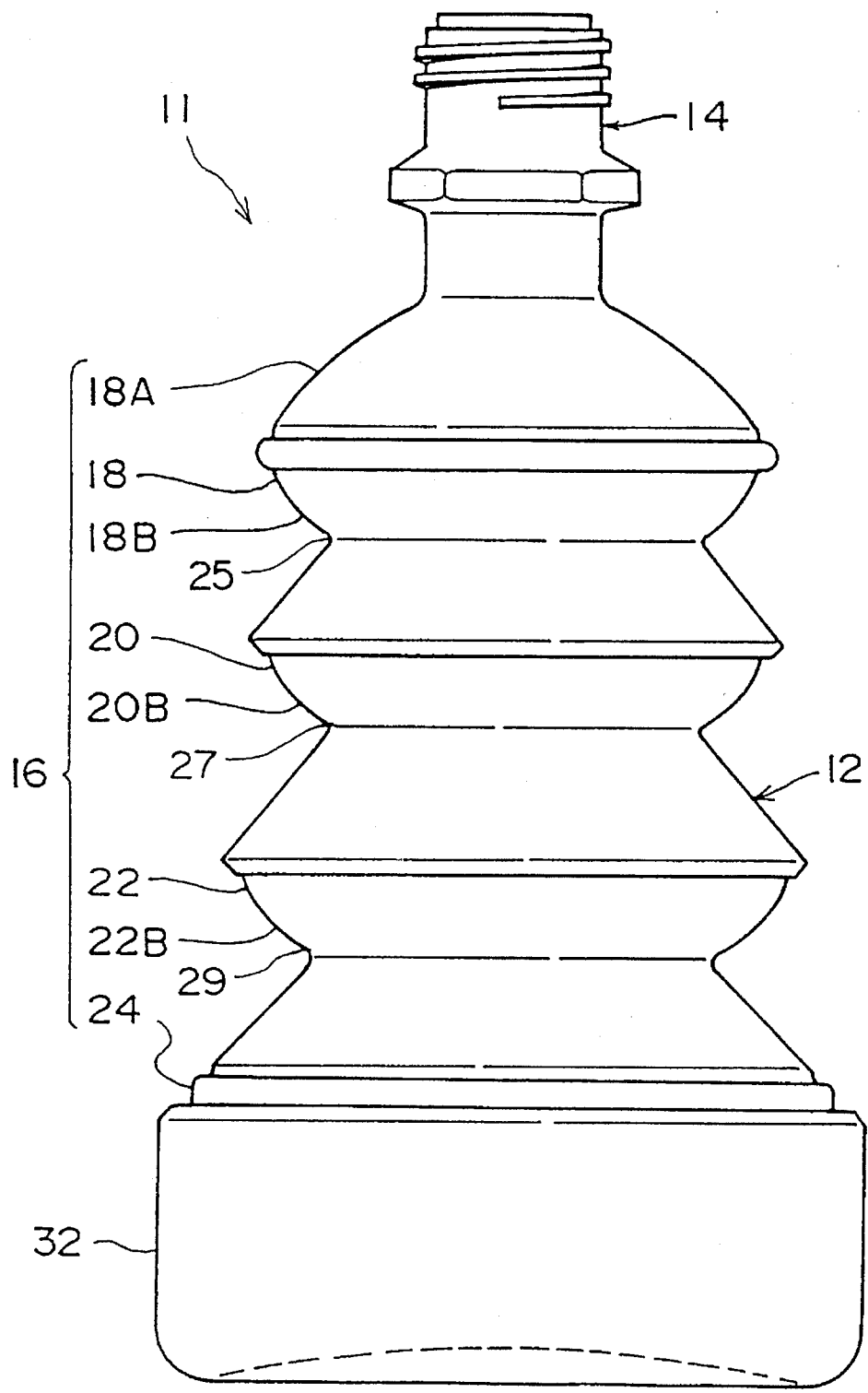
FIG. 6 is a front view illustrating a container for a liquid relating to a variant example of the first embodiment.
Figure 7:
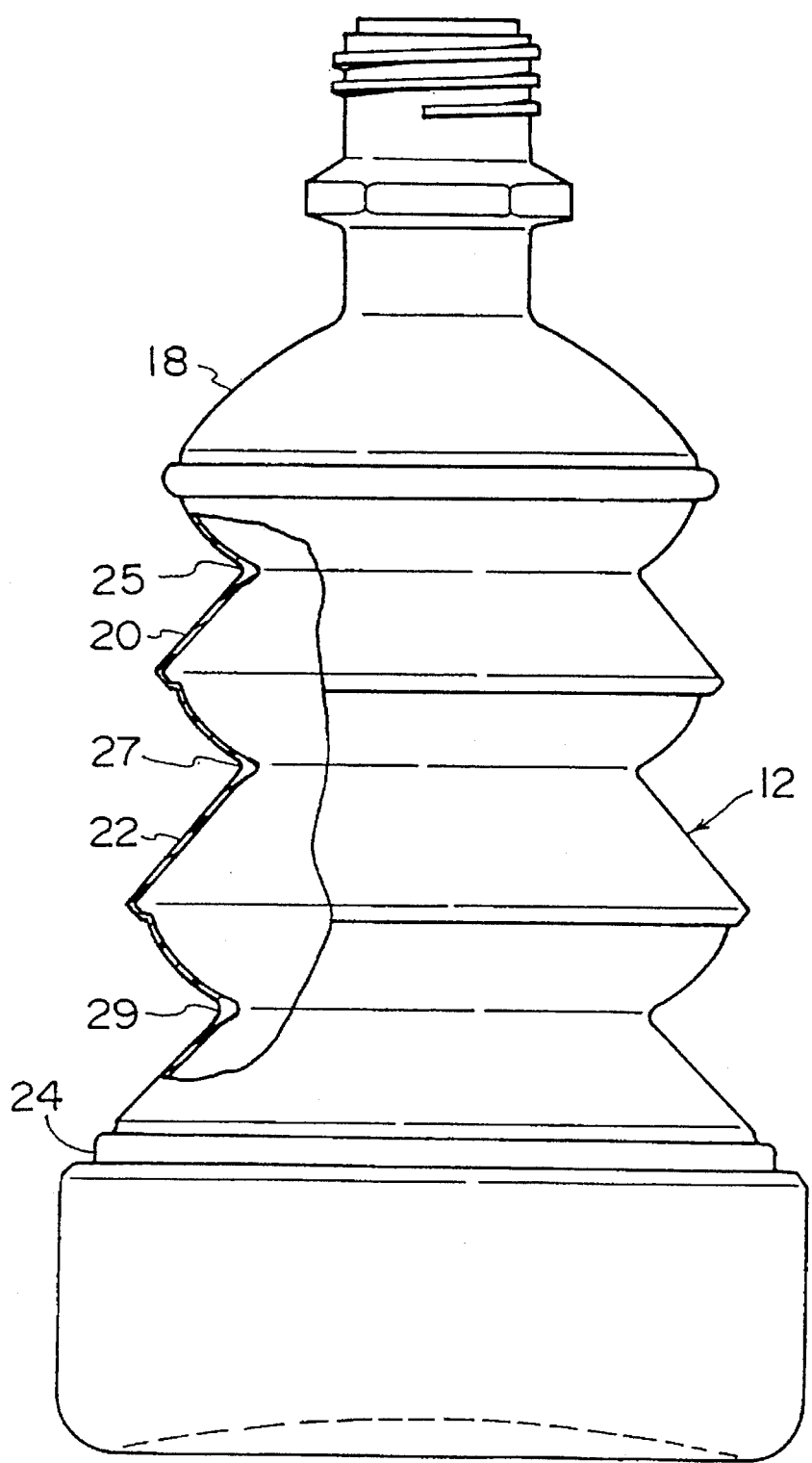
FIG. 7 is a front view in which the container for a liquid of FIG. 6 is partially broken.

As illustrated in FIG. 6, in a container for a liquid 11 of the variant example, the bellows portion 16 of the container main body 12 is formed from the first through the third abacus bead shaped portions 18, 20, 22 and the stepped cylindrical portion 24. For each of the first through the third abacus bead shaped portions 18, 20, 22, the axial direction dimension of the portion above the maximum diameter portion, which serves as a maximum annular protruding portion, (i.e., the portion nearer to the opening portion 14) is greater than the axial direction dimension of the portion below the maximum diameter portion (i.e., the portion nearer to the base portion 32). R portions 18B, 20B, 22B are formed at the portions of the first through the third abacus bead shaped portions 18, 20, 22, respectively, which are below the respective maximum diameter portions. The first abacus bead shaped portion 18 is formed so as to be connected to the opening portion 14. As a result, the axial direction dimension (the dimension in the vertical direction of FIG. 6) of the portion of the first abacus bead shaped portion 18 above the maximum diameter portion thereof is large. Further, the R portion 18A, which has a relatively Large radius of curvature, is formed at the portion of the first abacus bead shaped portion 18 above the maximum diameter portion. The surface area of the R portion 18A is large. Accordingly, a label or the like can be adhered to the R portion 18A so as to indicate the type of contents of the container, the method of using the processing solution in the container, notes on handling the container, or the like.

Alternatively, such information can be displayed by being printed in ink or by being etched or the like. The displayed information can therefore be conveniently verified from above as well as from the side.

In the variant example, a small diameter portion is not provided in the base portion 22, as it is in the above-described first embodiment.

In the container for a liquid 11, cylindrical connecting portions are not provided between the first abacus bead shaped portion 18 and the second abacus bead shaped portion 20, nor between the second abacus bead shaped portion 20 and the third abacus bead shaped portion 22, nor between the third abacus bead shaped portion 22 and the stepped cylindrical portion 24. The respective minimum protruding portions of the first abacus bead shaped portion 18 and the second abacus bead shaped portion 20 of the axial direction ends which protrude the least in the direction orthogonal to the axis are directly connected. The second abacus bead shaped portion 20 and the third abacus bead shaped portion 22 are connected in a similar manner. Further, the third abacus bead shaped portion 22 and the stepped cylindrical portion 24 are also connected in the same way.

The respective diameters of a connecting portion 25, which connects the first abacus bead shaped portion 18 and the second abacus bead shaped portion 20, and a connecting portion 27, which connects the second abacus bead shaped portion 20 and the third abacus bead shaped portion 24, and a connecting portion 29, which connects the third abacus bead shaped portion 22 and the stepped cylindrical portion 24, are smaller than the respective diameters of the first abacus bead shaped portion 18, the second abacus bead shaped portion 20 and the third abacus bead shaped portion 22. Therefore, as illustrated in FIG. 7, during blow molding, the connecting portions 25, 27, 29 are formed so as to be more thick than the first abacus bead shaped portion 18, the second abacus bead shaped portion 20, the third abacus bead shaped portion 22 and the stepped cylindrical portion 24.

The structures of other parts, the entire construction, the materials, the method of manufacturing, and the like are same as those of the above-described first embodiment.

The operation and effects of this variant example are the same as those of the first embodiment. Further, in the variant example, when the bellows portion 16 is gradually contracted in accordance with the amount of liquid which has been discharged, the container for a liquid 11 is ultimately shaped as illustrated in FIG. 8. In this state, there are no portions in which liquid accumulates, such as the portions denoted by reference numerals 38A, 38B, 38C in FIG. 4, when the final liquid remaining in the interior is discharged in the first embodiment. Therefore, the container for a liquid 11 is advantageous in that it is difficult for liquid to remain therein (as can easily be understood by comparing FIG. 4 and FIG. 8). Further, because the R portions 18B, 20B, 22B are provided in the variant example, reduction of the volume of the container is easy and it is difficult for the container for a liquid 11 to return to is original shape. It is desirable that the R portions 18B, 20B, 22B are greater than or equal to 5R, preferably 15R to 60R, and more preferably 15R to 40R.

When the radii of curvature of the R portions are increased so that the number of steps in the bellows portion 16 is reduced, the entire structure nears a cylindrical shape, and the rate of increase of the specific surface area (using a cylindrical container of the same internal volume as a standard) is reduced. This is preferable from the standpoint of reducing the amount of permeating oxygen.

Figure 8:
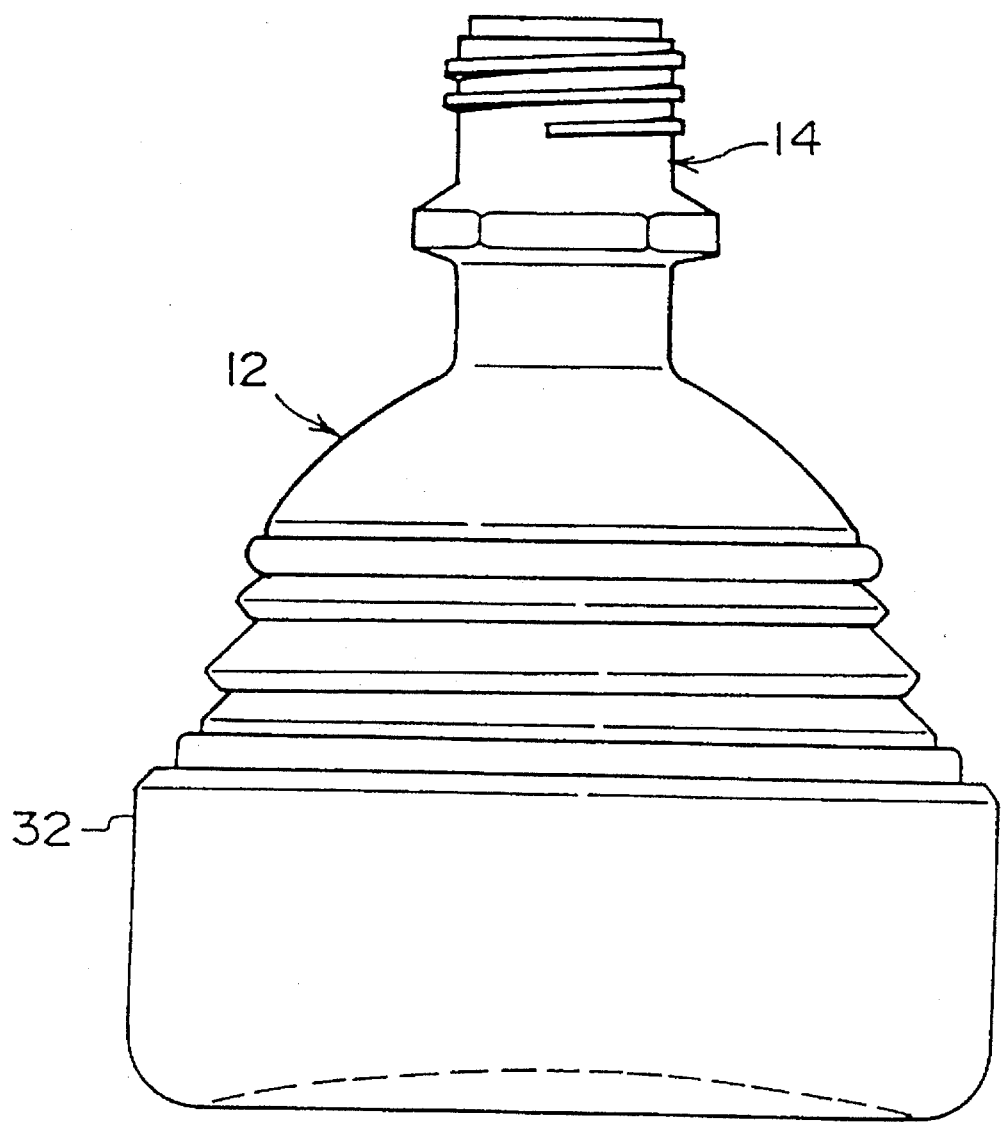
FIG. 8 is a front view illustrating a state in which the container for a liquid of FIG. 6 is in a volume-reduced state.

In the variant example as well, it is desirable that the rate of volume reduction, which is the ratio of the volume in the state shown in FIG. 6 before the bellows portion 16 has been compressed and the volume in the state shown in FIG. 8 after the bellows portion 16 has been completely compressed, is less than or equal to 50%, preferably less than or equal to 40%, and more preferably less than or equal to 30%. However, it is preferable that the rate of volume reduction is greater than or equal to 10% from the standpoints of manufacturing and design.

Figure 9:
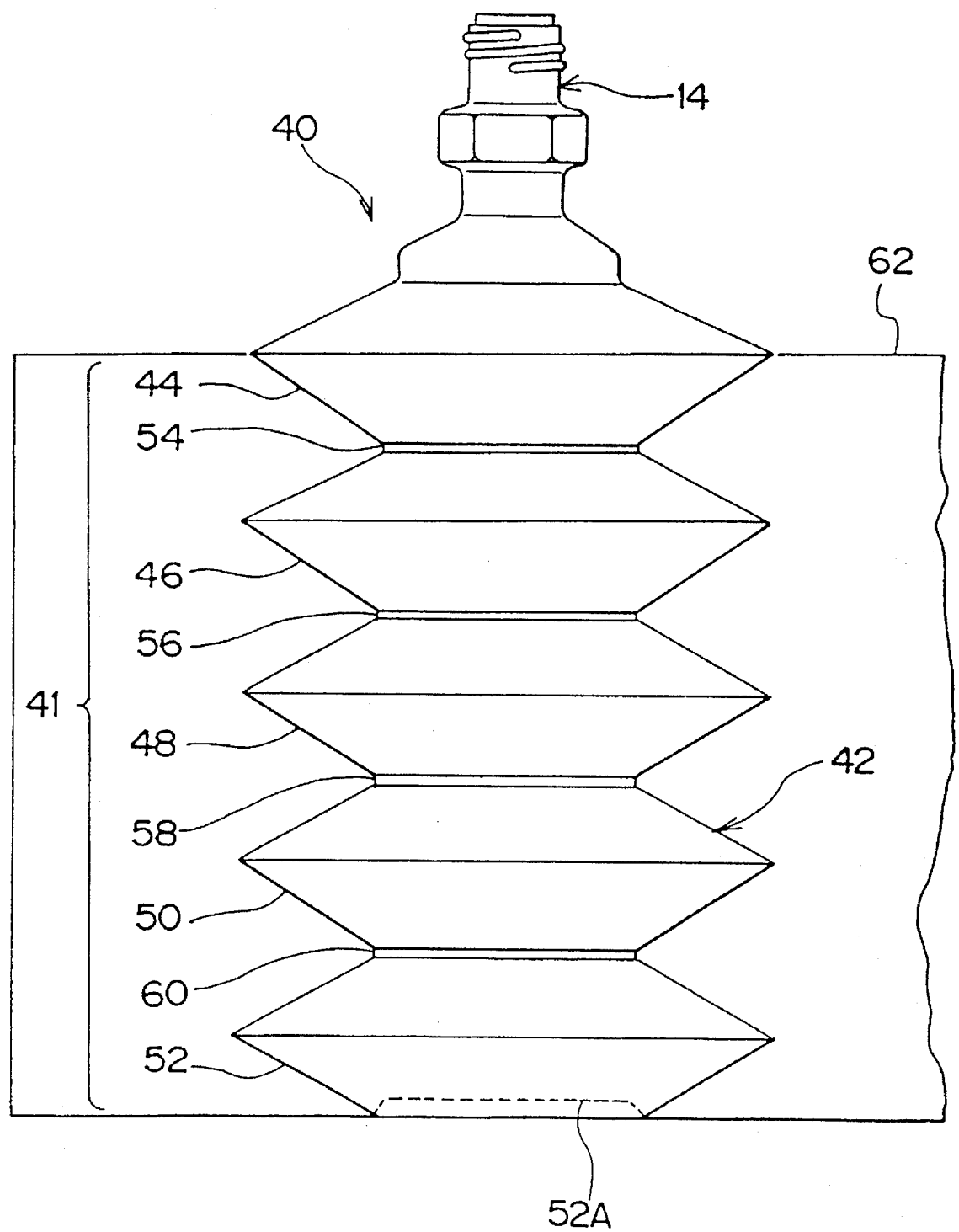
FIG. 9 is a front view illustrating a state before a paper is wrapped around a container for a liquid relating to a second embodiment of the present invention.
Figure 10:
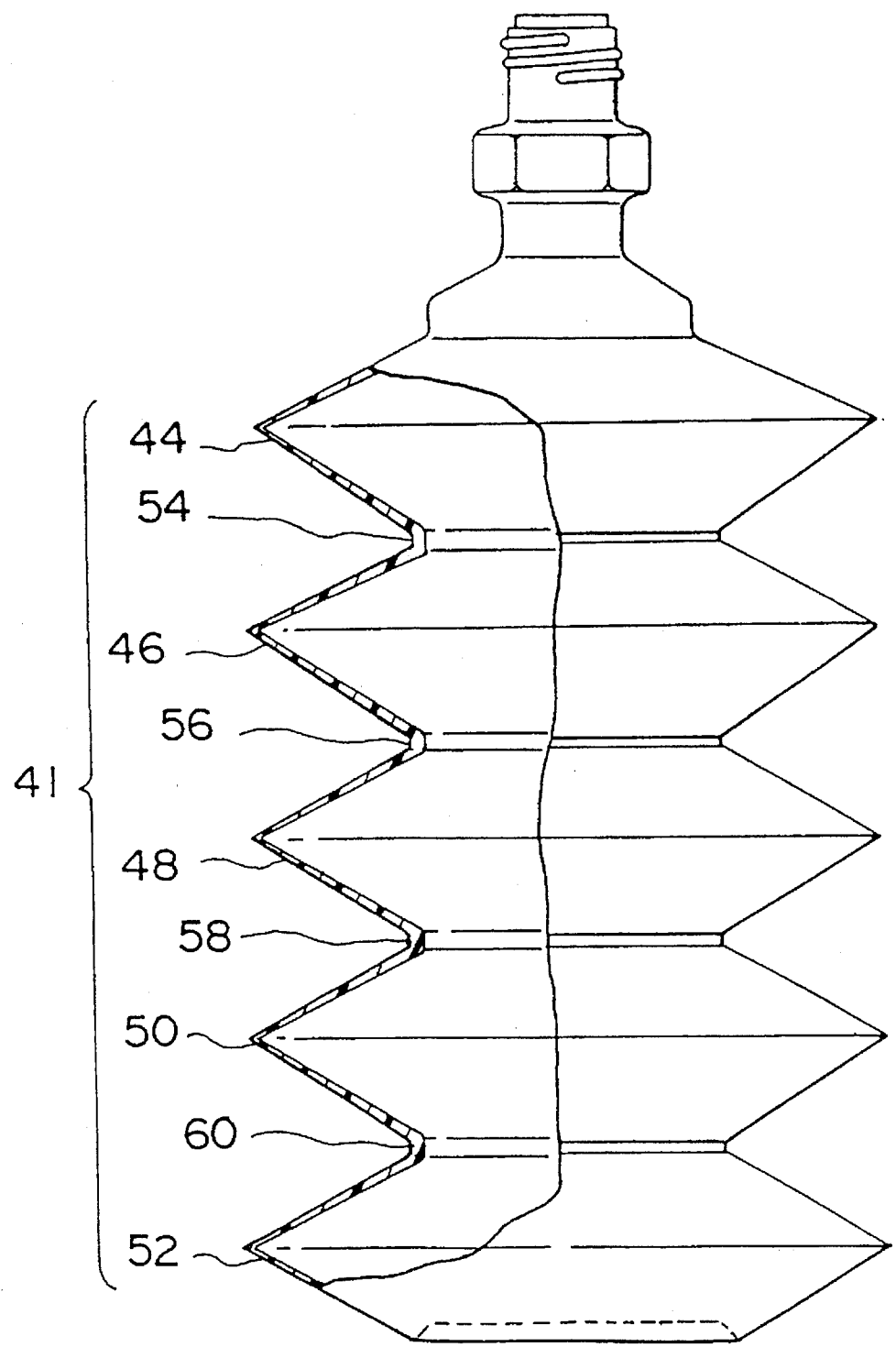
FIG. 10 is a front view in which the container for a liquid of FIG. 9 is partially broken.
Figure 11:
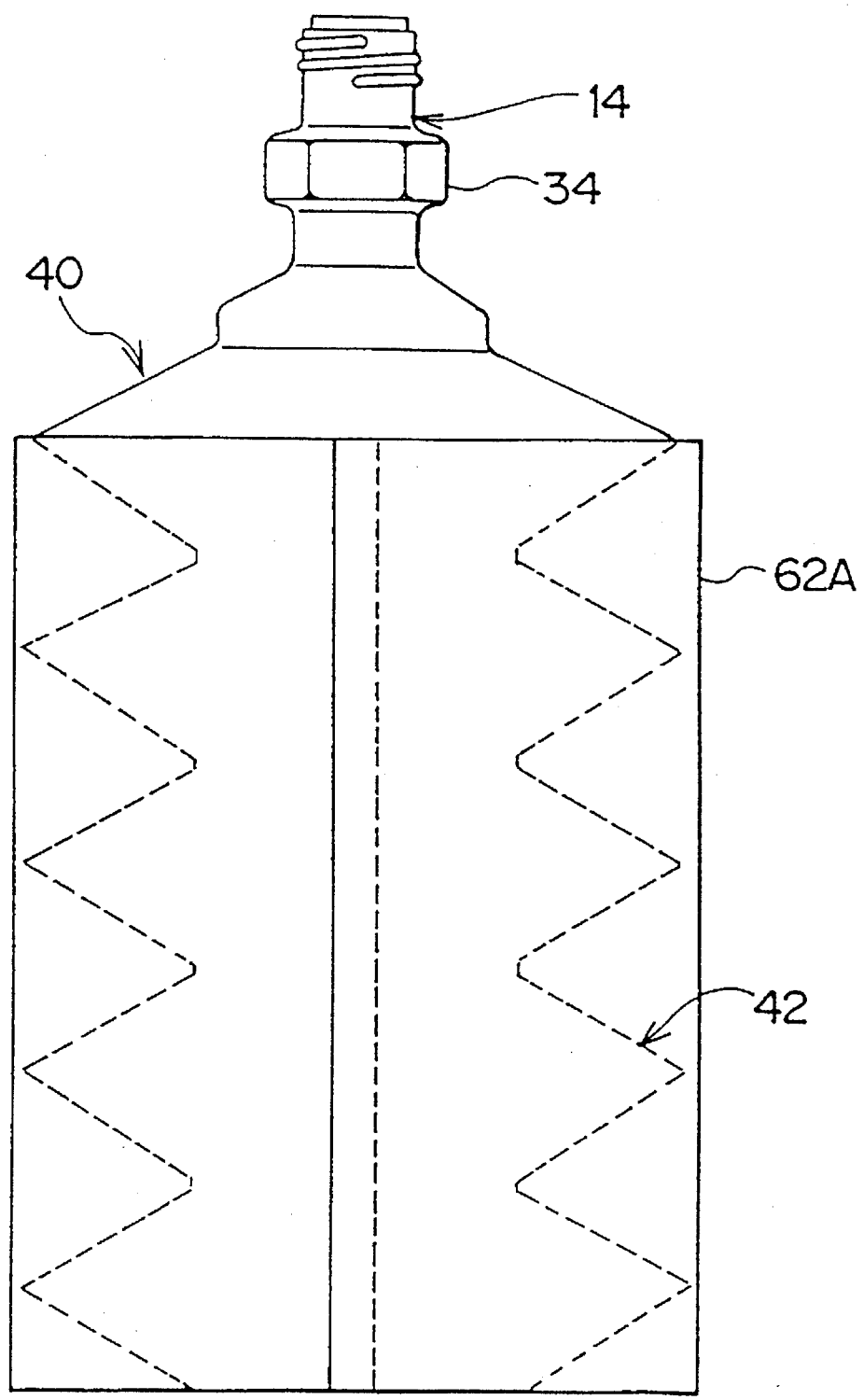
FIG. 11 is a front view illustrating a state in which an outer tube is wrapped around the container for a liquid of FIG. 9.

Next, the second embodiment of the present invention will be described with reference to FIGS. 9 through 11. Structural portions which are the same as those of the previously-described first embodiment are denoted by the same reference numerals, and description thereof is simplified or omitted.

A container for a liquid 40 of the second embodiment has a flexible container main body 42 and the rigid opening portion 14 protruding from the container main body 42 in the axial direction. The second embodiment is similar to the first embodiment in so far as the container main body 42 and the opening portion 14 are formed integrally by blow molding.

A bellows portion 41, which, in the same way as the first embodiment, is continuous along the entire axial direction (the vertical direction in FIG. 9) length until the border of the container main body 42 and the opening portion 14, is formed at the container main body 42. The bellows portion 41 is formed of fourth through eighth abacus bead shaped portions 44, 46, 48, 50, 52 and fourth through seventh cylindrical connecting portions 54, 56, 58, 60. The fourth through the eighth abacus bead shaped portions 44, 46, 48, 50, 52 are annular convex portions respectively having the same diameter, and are set in five levels from the top to the bottom of the bellows portion 41. The fourth cylindrical connecting portion 54 is a band-shaped, annular connecting portion which connects the fourth abacus bead shaped portion 44 and the fifth abacus bead shaped portion 46 at respective minimum protruding portions thereof which protrude the least in a direction orthogonal to the axis. The fifth cylindrical connecting portion 56 is a band-shaped, annular connecting portion which connects the fifth abacus bead shaped portion 46 and the sixth abacus bead shaped portion 48 at respective minimum protruding portions thereof which protrude the least in the direction orthogonal to the axis. The sixth cylindrical connecting portion 58 is a band-shaped, annular connecting portion which connects the sixth abacus bead shaped portion 48 and the seventh abacus bead shaped portion 50 at respective minimum protruding portions thereof which protrude the least in the direction orthogonal to the axis. The seventh cylindrical connecting portion 60 is a band-shaped, annular connecting portion which connects the seventh abacus bead shaped portion 50 and the eighth abacus bead shaped portion 52.

The fourth through the eighth abacus bead shaped portions 44, 46, 48, 50, 52 are shaped so that respective upper and lower portions thereof are symmetrical.

The respective diameters of the fourth through the seventh cylindrical connecting portions 54, 56, 58, 60 are equal to the respective minimum diameters of the fourth through the eighth abacus bead shaped portions 44, 46, 48, 50, 52. Therefore, during blow molding, as illustrated in FIG. 10, the fourth through the seventh cylindrical connecting portions 54, 56, 58, 60 are formed so as to be more thick than the fourth through the eighth abacus bead shaped portions 44, 46, 48, 50, 52. The self-supportability of the container for a liquid 40 is thereby ensured.

It is desirable that the respective diameters of the fourth through the seventh cylindrical connecting portions 54, 56, 58, 60 are less than or equal to 85% of the diameters of the respective maximum diameter portions of the fourth through the eighth abacus bead shaped portions 44, 46, 48, 50, 52, preferably 40 to 75%, and more preferably 50 to 75%. This is in order to improve the collapsing efficiency and keep the container main body 42 from returning to its original configuration when the bellows portion 41 is compressed and the volume of the container main body 42 is reduced after liquid has been discharged from the interior thereof.

A concave portion 52A is formed at the bottom portion of the eighth abacus bead shaped portion 52. The stability of the container for a liquid 40 when stood upright is thereby improved.

The same materials as used in the previously described first embodiment are used for the container main body 42 and the opening portion 14. Further, the container main body 42 and the opening portion 14 are formed integrally by blow molding.

As described above, in the container for a liquid 40, the fourth through the eighth abacus bead shaped portions 44, 46, 48, 50, 52 which form the bellows portion 41 have the same diameter. Therefore, a paper 62 can easily be wrapped around the outer periphery of the bellows portion 41. By attaching both ends of the wrapped paper 62 together by paste or an adhesive or the like, an outer tube 62A such as that illustrated in FIG. 11 can be formed.

The second embodiment which is structured as described above has the same operation and effects as those of the first embodiment. Further, in the second embodiment, when the container for a liquid 42 is not very self-supportable, the self-supportability can be ensured by the outer tube 62A. In the second embodiment, the container main body 42 can be made more thin (depending on the case, the container main body 42 may be made thin to the extent that it is not self-supportable at all). When considering only the ease of reduction of volume, it is preferable that the self-supportability of the container is low. Further, the container main body 42 is easier to hold when the outer tube 62A is wrapped therearound.

If the container for a liquid 40 is formed so large that it is difficult to hold the outer peripheral portion of the outer tube 62, holes of a size which allows insertion of a finger between the outer tube 62A and the container main body 42 may be formed in the outer tube 62A. A user may insert his/her fingers in the holes so as to grip the peripheries of the fourth and fifth cylindrical connecting portions 54, 56 or the like. Further, the outer tube 62A may be formed in advance as a tube whose inner diameter is slightly larger than the outer diameter of the container for a liquid 40. Alternatively, the outer tube 62A may be formed as a tube having a bottom so that the container for a liquid 40 does not fall out from the bottom when the container for a liquid 40 is lifted via the outer tube 62A.

In the second embodiment, an example is given in which the outer tube 62A is formed from paper. However, instead of paper, shrink film (heat contractible film) may be used to form the outer tube 62A. By heating the outer tube 62A in the state shown in FIG. 11, the outer tube 62A contracts so as to fit to the outer periphery of the container main body 42. Further, in the second embodiment, the bellows portion 41 is formed along the entire axial direction of the container main body 42 from the border of the container main body 42 and the opening portion 14 to the bottom portion. However, the bellows portion may be provided at a portion of the container main body 42 from the border with the opening portion 14 to the bottom portion, and it suffices to attach the outer tube to only the outer periphery of this bellows portion.

Figure 12:
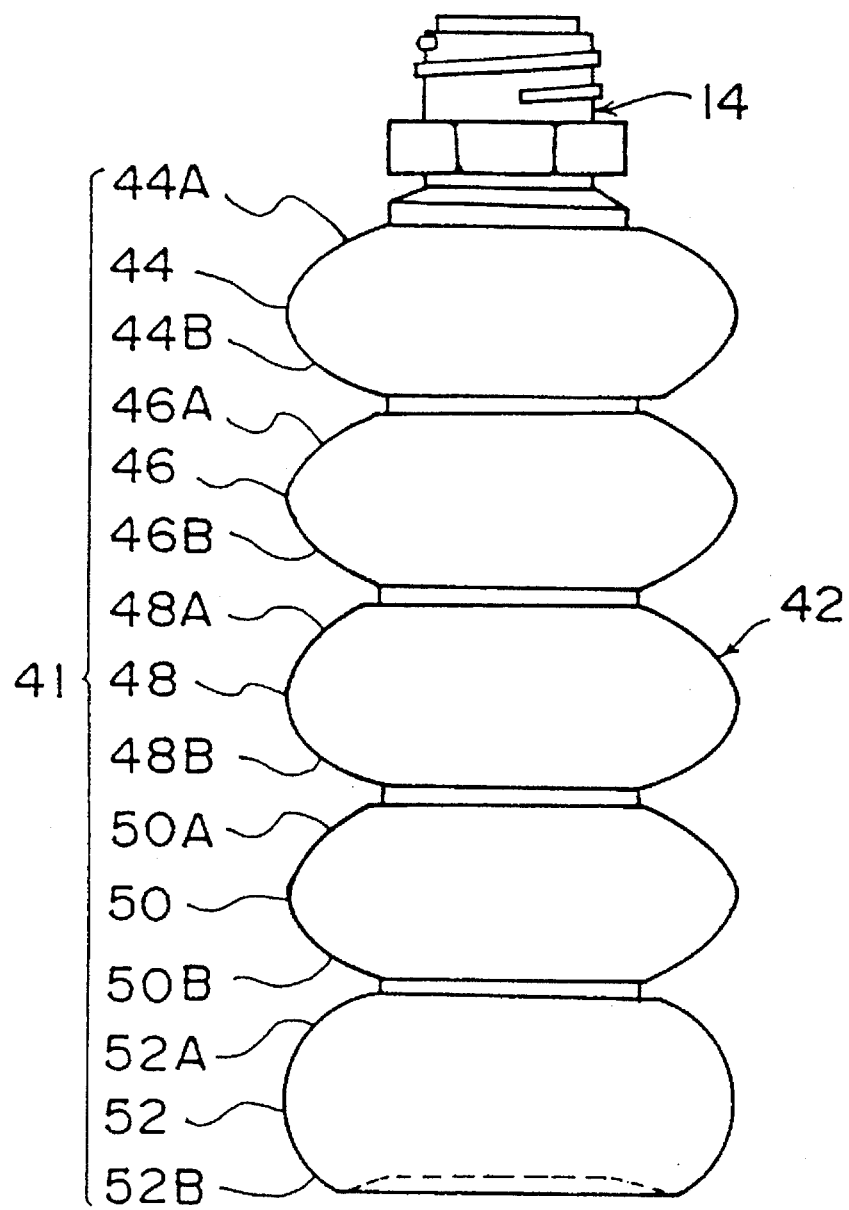
FIG. 12 is a front view illustrating a container for a liquid relating to a variant example of the second embodiment.

Next, a variant example of the second embodiment will be described with reference to FIG. 12. Structural portions which are the same as or similar to those of the above-described second embodiment are denoted by the same reference numerals.

The variant example is the same as the second embodiment in so far as the bellows portion 41, which is formed along the entire axial direction length of the container main body 42, is formed by the fourth through the eighth abacus bead shaped portions 44, 46, 48, 50, 52 which have equal diameters and which are arranged as five levels from the top to the bottom of the bellows portion 41. However, as illustrated in FIG. 12, R portions 44A, 44B, 46A, 46B, 48A, 48B, 50A, 50B, 52A, 52B are formed above and below the maximum diameter portions of the fourth through the eighth abacus bead shaped portions 44, 46, 48, 50, 52, respectively.

When the bellows portion 41 is contracted and the volume of the container main body 42 is reduced, the R portions 44A through 52B improve the collapsing efficiency. In addition, when the container main body 42 is tightly pushed in, the R portions 44A through 52B make it difficult for the container main body 42 to return to its original configuration. In order to achieve these objects, it is desirable that the R portions 44A through 52B are greater than or equal to 5R, preferably 15R to 60 R, and more preferably 15R through 40R.

The structure of the other portions, the entire structure, the materials, the method of manufacturing and the like are similar to those of the second embodiment.

In the variant example, the same operational effects as those of the second embodiment are obtained. Further, due to the operation of the R portions 44A through 52B, the volume can be reduced even further, and it is more difficult for the container main body 42 to return to its original shape.

In the first and second embodiments (and their respective variant examples), the cross sectional configurations of the container main bodies in a direction orthogonal to the axis are circular. However, the present invention is not limited to the same, and the cross sectional configuration of the container main body may be formed as an oval, for example. If the cross sectional configuration of the container main body is formed as an oval, a larger volume of liquid can be filled therein as compared with a circular container of the same height whose diameter is the same as the shorter radius of the oval. Further, if the cross sectional configuration of the container main body is oval, even a considerably large volume container (e.g., two to five liters) can be gripped by a user. Moreover, in the case of photographic processing chemicals, often different several types of containers are included in the same box. In this case as well, containers, in which the cross sectional configuration of the container main body in a direction orthogonal to the axis is oval, result in less dead space than containers whose cross sectional configuration is circular. The containers can thereby be efficiently packed in a box.

Figure 13:
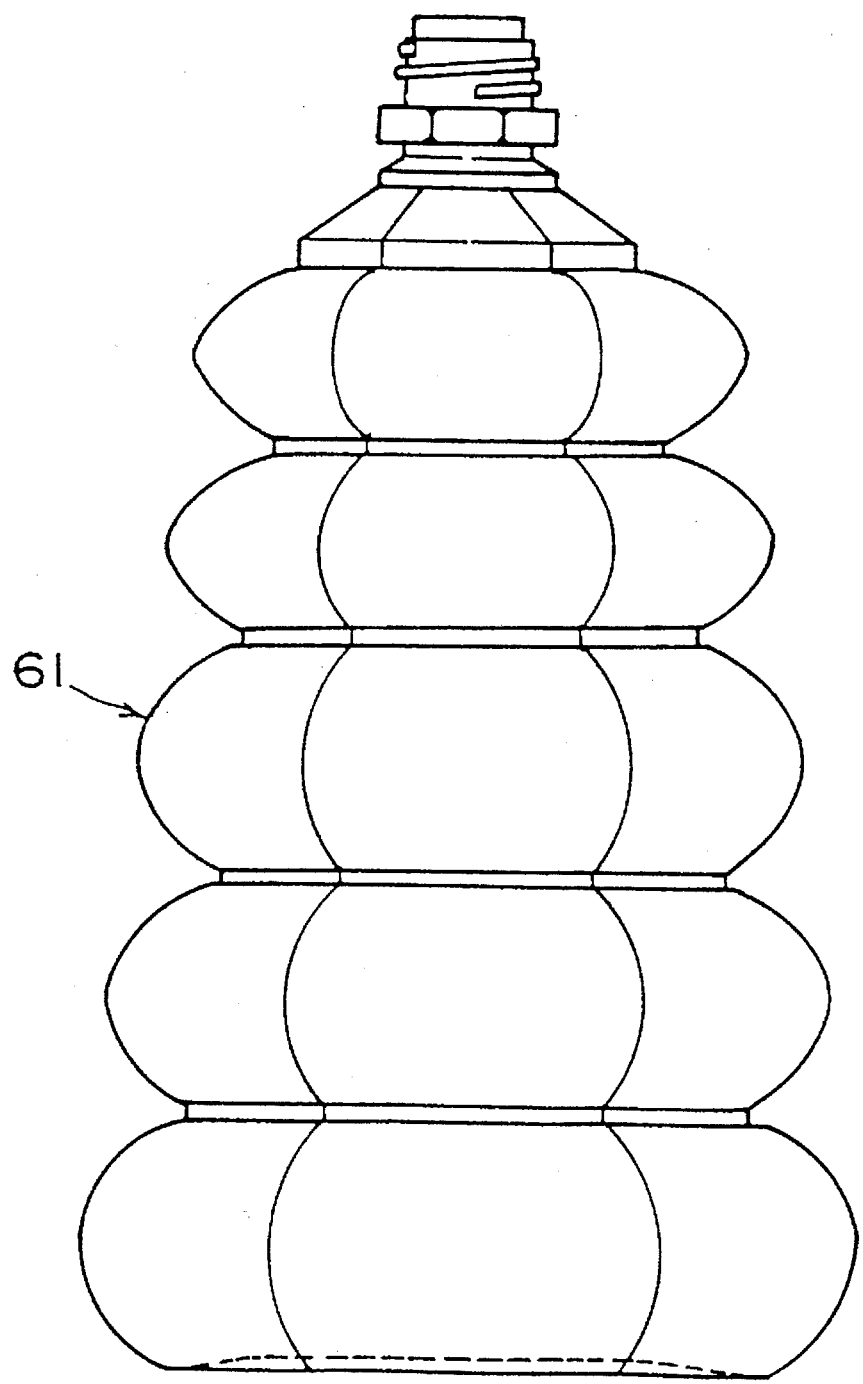
FIG. 13 is a front view illustrating an example of a container for a liquid in which a cross section of a container main body orthogonal to an axis is hexagonal.

The cross sectional configuration orthogonal to the axis of the container main body may be a polygonal shape, such as substantially quadrangular, substantially hexagonal, substantially octagonal, or the like. By making the cross sectional configuration of the container main body in the direction orthogonal to the axis quadrangular, such as square, rectangular, or the like, efficient use of space can be made when a plurality of the containers are accommodated in a box or the like. In particular, as illustrated in FIG. 13, in a case in which the cross sectional configuration of a container main body 61 orthogonal to the axis is hexagonal, when a plurality of the containers are placed in a box or the like, the efficiency can be increased even further by arranging the containers in a so-called honeycomb shape. The container for a liquid illustrated in FIG. 13 is structured as a combination of the first embodiment and the second embodiment. Namely, this structure is similar to the second embodiment in so far as five abacus bead shaped portions which are vertically symmetrical are provided, and is similar to the first embodiment in that the abacus bead shaped portions are arranged concentrically and such that the respective diameters thereof successively become larger from top to bottom.

Figure 14:
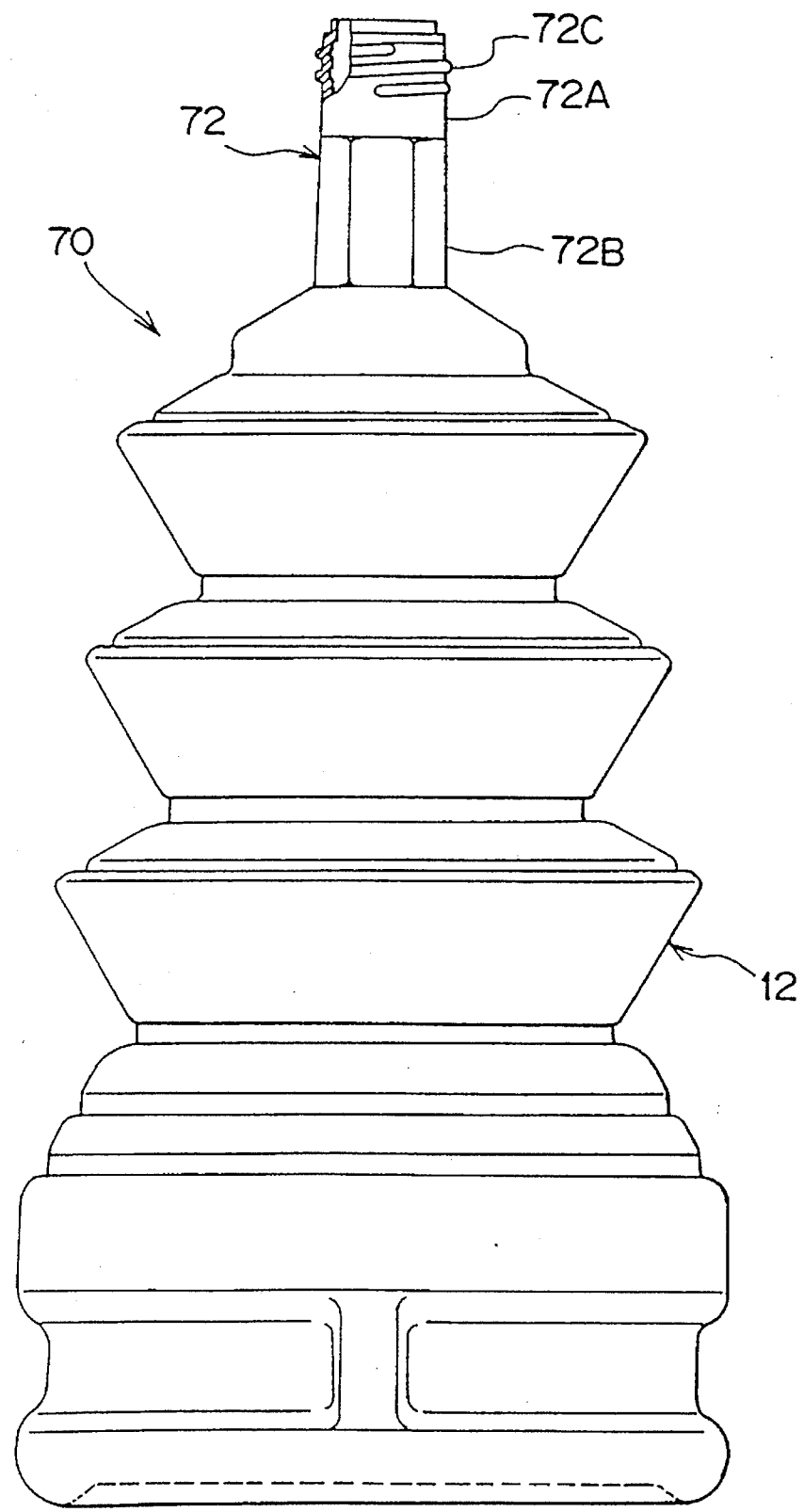
FIG. 14 is a front view in which a container for a liquid relating to a third embodiment is partially broken.

Next, a third embodiment of the present invention will be described with reference to FIG. 14. Structural portions which are the same as those of the first embodiment are denoted by the same reference numerals, and description thereof is simplified or omitted.

A container for a liquid 70 of the present embodiment is characterized in that an opening portion 72 is formed instead of the opening portion 14 of the container for a liquid 10 of the first embodiment.

The upper end portion (opening end) 72A of the opening portion 72 is formed as a cylinder. The lower end portion (opening base) 72B is formed so as to have a hexagonal cross section, and the maximum diameter thereof is the same as the diameter of the upper end portion 72A. A male screw portion 72C is formed at the outer peripheral portion of the upper end portion 72A of the opening portion 72. A female screw portion which screws with the male screw portion 72C is formed on the inner wall of a rigid lid member (unillustrated). The rigid lid member screws with the outer circumferential portion of the upper end portion 72A of the opening portion 72 so that the upper portion opening of the opening portion 72 is opened and closed. The structures of other portions are the same as those of the previously-described first embodiment.

The operation and effects of the third embodiment are the same as those of the previously-described first embodiment. Further, because the cross section of the lower end portion (opening base) of the opening portion is hexagonal, this portion can be held by a user or at a machine. Screwing on or removal of the lid member is thereby facilitated.

The configuration of the lower end portion of the opening portion 72 is not limited to a hexagonal cross sectional configuration. As long as the cross sectional shape of the lower end portion is a noncircular shape, such as substantially quadrangular, substantially octagonal, or the like, the same effects can be achieved.

The fourth embodiment of the present invention will now be described with reference to FIGS. 15 through 17.

Figure 15:
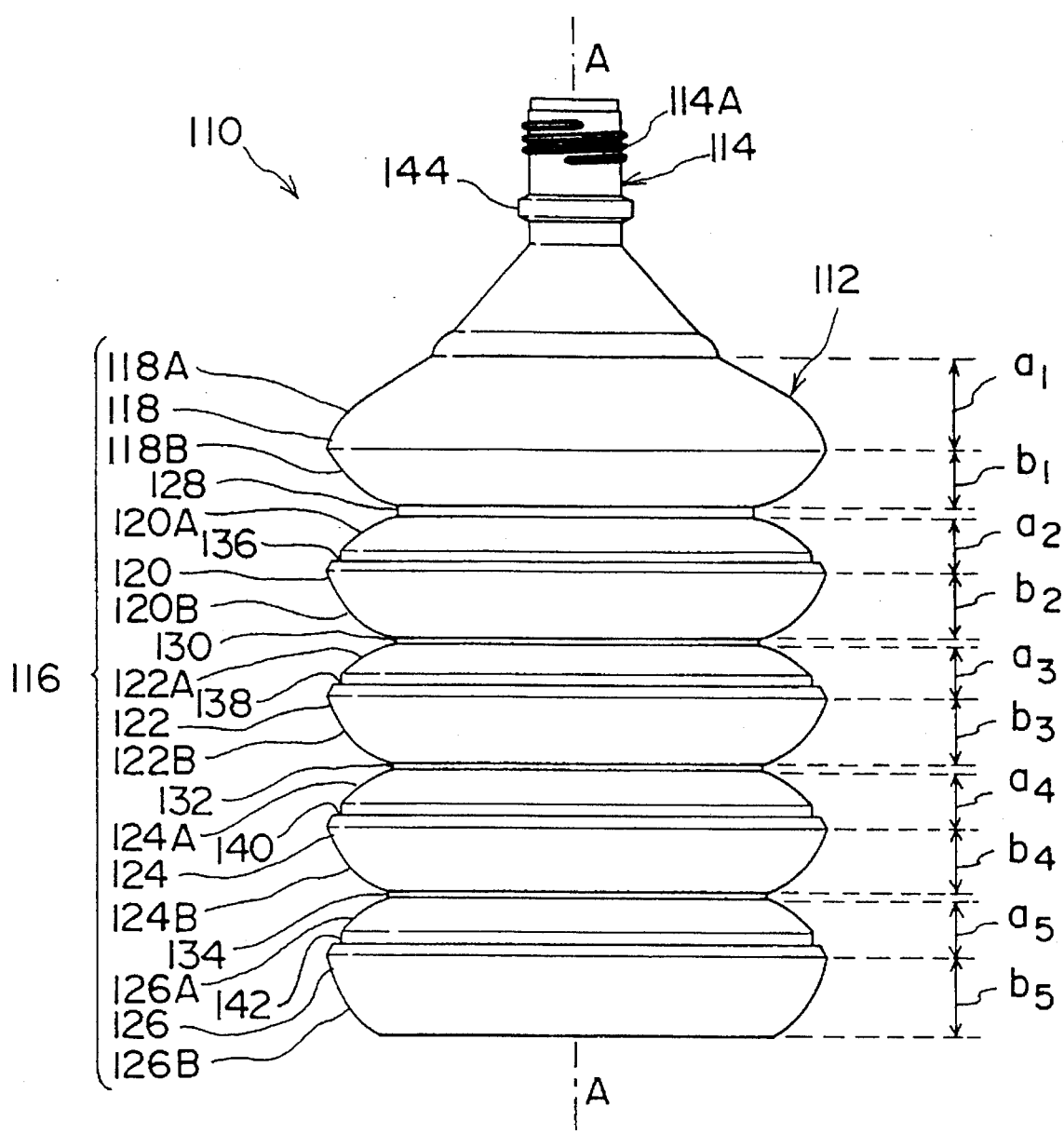
FIG. 15 is a front view illustrating a container for a photographic processing composition relating to a fourth embodiment.
Figure 16:
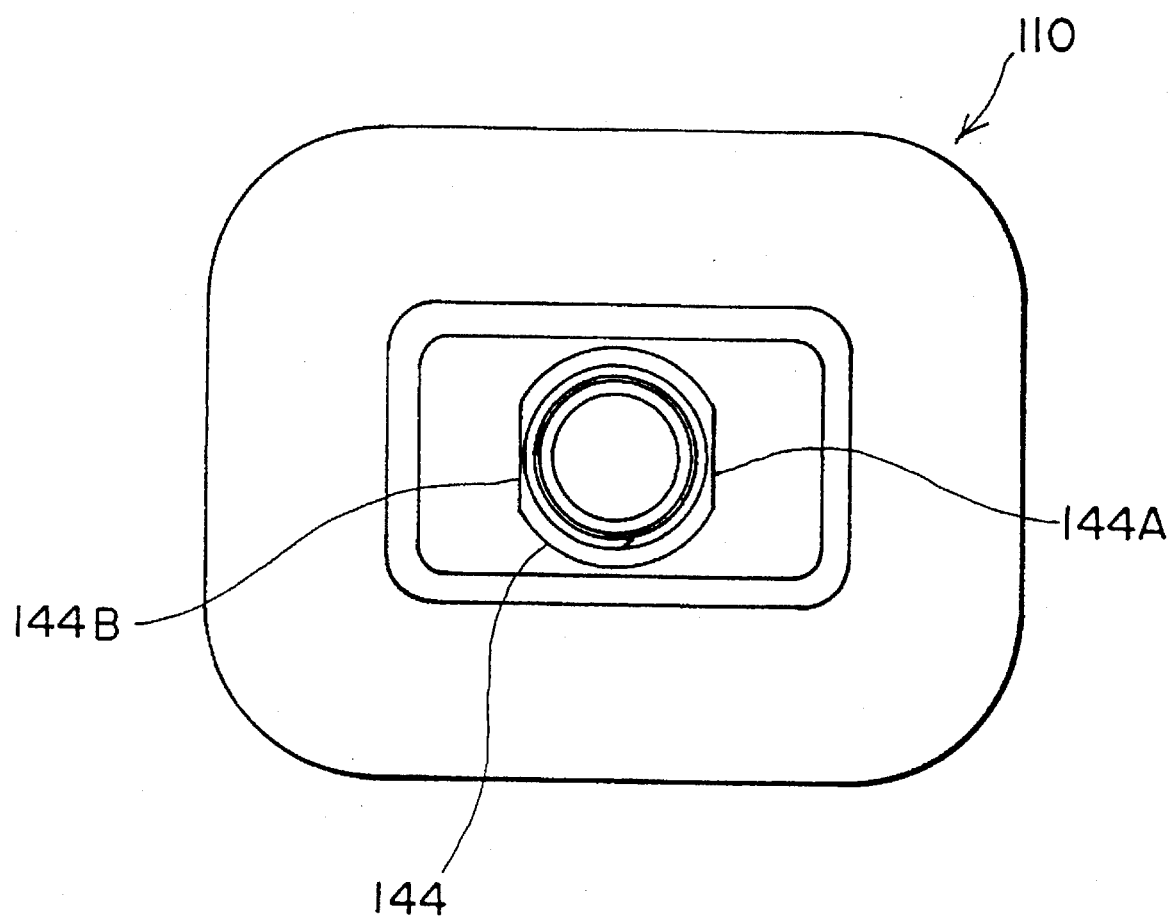
FIG. 16 is a plan view of FIG. 15.

A container for a photographic processing composition 110 of the present embodiment, which is illustrated in FIG. 15, includes a flexible container main body 112 and a rigid opening portion 114 which protrudes upwardly from the container main body 112. The container main body 112 and the opening portion 114 are formed integrally by blow molding. Further, the cross sectional configuration of the container for a photographic processing composition 110 is substantially rectangular (as can be seen in the plan view of FIG. 16).

A bellows portion 116 is formed at the container main body 112 so as to be continuous from the boundary between the container main body 112 and the opening portion 114 to the bottom portion. The bellows portion 116 includes first, second, third, fourth and fifth annular convex portions 118, 120, 122, 124, 126, and first, second, third, and fourth annular connecting portions 128, 130, 132, 134. The first through the fifth annular convex portions 118, 120, 122, 124, 126 are disposed at predetermined intervals along the direction of the A—A axis. The first annular connecting portion 128 is band-shaped and connects the first annular convex portion 118 and the second annular convex portion 120 at respective minimum protruding portions, which protrude the least in a direction orthogonal to the axis, of both axial direction ends of the first annular convex portion 118 and the second annular convex portion 120 (the upper and lower ends in FIG. 15). The second annular connecting portion 130 is band-shaped and connects the second annular convex portion 120 and the third annular convex portion 122 at respective minimum protruding portions, which protrude the least in the direction orthogonal to the axis, of both axial direction ends of the second annular convex portion 120 and the third annular convex portion 122. The third annular connecting portion 132 connects the third annular convex portion 122 and the fourth annular convex portion 124 at respective minimum protruding portions, which protrude the least in the direction orthogonal to the axis, of both axial direction ends of the third annular convex portion 122 and the fourth annular convex portion 124. The fourth annular connecting portion 134 connects the fourth annular convex portion 124 and the fifth annular convex portion 126 at respective minimum protruding portions, which protrude the least in the direction orthogonal to the axis, of both axial direction ends of the fourth annular convex portion 124 and the fifth annular convex portion 126.

The respective cross sectional configurations orthogonal to the axis of the first through the fifth annular convex portions 118 through 126 and the first through the fourth annular connecting portions 128 through 134 are substantially rectangular. Respective annular maximum protruding portions, which protrude by the greatest amount in the direction orthogonal to the axis, of the first, second, third, fourth and fifth annular convex portions 118, 120, 122, 124, 126 are provided at the respective intermediate portions of the first, second, third, fourth and fifth annular convex portions 118, 120, 122, 124, 126 in the axial direction (in the vertical direction in FIG. 15). As the respective annular maximum protruding portions have the same size and shape, they are set in a superposed arrangement when viewed from the axial direction. The axial direction dimensions of the respective portions of the second, third, fourth, and fifth annular convex portions 120, 122, 124, 126 below the respective annular maximum protruding portions thereof are larger than the axial direction dimensions of the respective portions thereof above the annular maximum protruding portions. In contrast, the axial direction dimension of the portion of the first annular convex portion 118 above the annular maximum protruding portion thereof is larger than the axial direction dimension of the portion thereof below the annular maximum protruding portion. Namely, as illustrated in FIG. 15, $a_2<b_2$, $a_3<b_3$, $a_4<b_4$, $a_5<b_5$, and $a_1>b_1$.

Further, fourth, fifth, six and seventh annular concave grooves 136, 138, 140, 142 are formed above respective vicinities of the annular maximum protruding portions of the second, third, fourth and fifth annular convex portions 120, 122, 124, 126 around the entire peripheries thereof.

R portions 118A, 118B, 120A, 120B, 122A, 122B, 124A, 124B, 126A, 126B are formed at the first, second, third, fourth and fifth annular convex portions 118, 120, 122, 124, 126 at portions above and below vicinities of the respective annular maximum protruding portions thereof. The radius of curvature of the R portion 120A is larger than that of the R portion 120B; the radius of curvature of the R portion 122A is larger than that of the R portion 122B; the radius of curvature of the R portion 124A is larger than that of the R portion 124B. In contrast, the radius of curvature of the R portion 118A is smaller than that of the R portion 118B. The radius of curvature of the R portion 126A is substantially equal to the radius of curvature of the R portion 126B.

The radii of curvature of the R portions are greater than or equal to 5 mm, preferably 15 mm to 60 mm, and more preferably 15 mm to 40 mm.

From the standpoint of improving the collapsing efficiency, it is preferable that the maximum diameter of the first annular connecting portion 128 is less than or equal to 85%, preferably 40 to 75%, and more preferably 50 to 75% of the maximum diameter of the first annular convex portion 118, and that the same holds for the respective relations between the second annular connecting portion 130 and the second annular convex portion 120, and the third annular connecting portion 132 and the third annular convex portion 122, and the fourth annular connecting portion 134 and the fourth annular convex portion 124.

As can be clearly seen in FIG. 15, the lengths by which the first, second, third and fourth annular connecting portions 128, 130, 132 and 134 protrude from the central axis A—A in the direction orthogonal to the axis are smaller than the lengths by which the first, second, third, fourth and fifth annular convex portions 118, 120, 122, 124, 126 protrude from the central axis A—A in the direction orthogonal to the axis. Therefore, during blow molding by using a parison having a circular cross section, the first, second, third and fourth annular connecting portions 128, 130, 132, 134 are formed so as to be somewhat more thick than the first, second, third, fourth and fifth annular convex portions 118, 120, 122, 124 and 126.

Similarly to the opening portion 14 of the first embodiment, the opening portion 114 is formed integrally with the container main body 112 by blow molding. However, in the present embodiment, a flange portion 144 (see FIG. 16) is formed at an intermediate portion of the opening portion 114 in the vertical direction (axial direction). The cross sectional configuration of the flange portion 144 is formed as if both ends of a circle were cut in parallel so as to have the same chord length.

Similarly to the container for a liquid 10 of the first embodiment, if gas barrier ability is required of the container for a photographic processing composition 110 due to the liquid filled therein, the requisite gas barrier ability can easily be obtained by changing the materials and raw materials used.

Further, the container for a photographic processing composition 110 is formed of the same material as the container for a liquid 10 of the first embodiment. Accordingly, because low density polyethylene is used as the main body of the structure of the container for a photographic processing composition 110, the container for a photographic processing composition 110 is light-weight compared to conventional containers formed from high density polyethylene (HDPE).

In accordance with the container for a photographic processing composition 110 structured as described above, the opening portion 114 is formed so as to be relatively rigid, and parallel, even surfaces 144A, 144B (see FIG. 16) are formed at the flange portion 144. Therefore, for the same reasons as the container for a liquid 10 of the first embodiment, operations for filling the container for a photographic processing composition 110 with a processing solution such as developing solution, fixing solution or the like at a factory can be effected smoothly. Further, because the opening portion 114 is relatively rigid and the flange portion 114 is easy to hold, the main body portion 112 (which is flexible) is not twisted when a cap is removed. As a result, it is difficult for drawbacks to occur such as the liquid, e.g., processing solution, within the container for a photographic processing composition 110 accidentally overflowing from the opening portion 114. However, because one of the distinguishing features of the container for a photographic processing composition 110 is that it is flexible, overflowing of liquid during filling and use of the container occurs easily as compared with conventional, rigid containers. Therefore, in order to prevent such drawbacks, as in the first embodiment, it is preferable that the liquid filling rate is less than or equal to 95% and preferably about 95 to 85% of the volume of the container for a photographic processing composition 110 when the container for a photographic processing solution 110 is pulled in the axial direction such that the bellows portion 116 is extended as much as possible.

Because there are convex and concave portions in the bellows portion 116, when the bellows portion 116 is extended, it is easy to handle. Further, when the user is pouring the processing solution into a processing tank, the bellows portion 116 automatically expands and contracts, and the flow of liquid is fast, and there is little drawing in of air. Therefore, handling during pouring is easy, and the liquid can be poured smoothly.

In the present embodiment, during blow molding, the first through the fourth annular connecting portions 128 through 134 are formed so as to be more thick than the first through the fifth annular convex portions 118 through 126. Therefore, the self-supportability of the container for a photographic processing composition 110 can be sufficiently ensured by the configuration of the container main body 112 alone.

As the respective annular maximum protruding portions of the first through the fifth annular convex portions 118 through 126 which form the bellows portion 116 of the container main body 112 have the same size and configuration, they are set in a superposed arrangement when viewed from the axial direction. Therefore, when a plurality of the respective containers for a photographic processing composition 110 are placed in a box, there is almost no dead space between the containers for a photographic processing composition 110. Moreover, the axial direction dimensions of the portions below the annular maximum protruding portions of the second through the fifth annular convex portions 120 through 126 are greater than the axial direction dimensions of the portions above the annular maximum protruding portions. The R portions at the respective annular convex portions are formed so that the dimensions thereof have the above-described distinguishing features. The fourth through the seventh annular concave grooves 136 through 142 are formed in the peripheries of the portions of the second through the fifth annular convex portions 120 through 126 above respective vicinities of the annular maximum protruding portions thereof. Therefore, by pushing the opening portion 114 in the axial direction, the portions of the second through the fifth annular convex portions 120 through 126 above the respective annular maximum protruding portions thereof cave in downwardly and enter into the interiors of the portions below the annular maximum protruding portions such that, as illustrated in FIG. 17, the volume of the container main body 112 is reduced.

Further, as in the first embodiment, when the cap is removed and processing solution within the container for a photographic processing composition 110 is discharged from the opening portion 114, the opening portion 114 is pushed downward in the axial direction and the bellows portion 116 is contracted in accordance with the amount of discharged processing solution so that the head space can be adjusted. In this way, the processing solution within the container for a photographic processing composition 110 can always be maintained in a substantially full state, and oxidation can be prevented.

In the container for a photographic processing composition 110, the respective portions of the bellows portions 116 are formed with distinctive dimensions and thicknesses as described above. Therefore, even if the cap is removed in the collapsed state illustrated in FIG. 17, the container for a photographic processing composition 110 does not return to its original configuration. Therefore, the collection efficiency can be improved even if the cap and the container are collected separately after use thereof when the container is to be reused for material for a resin product.

Figure 17:
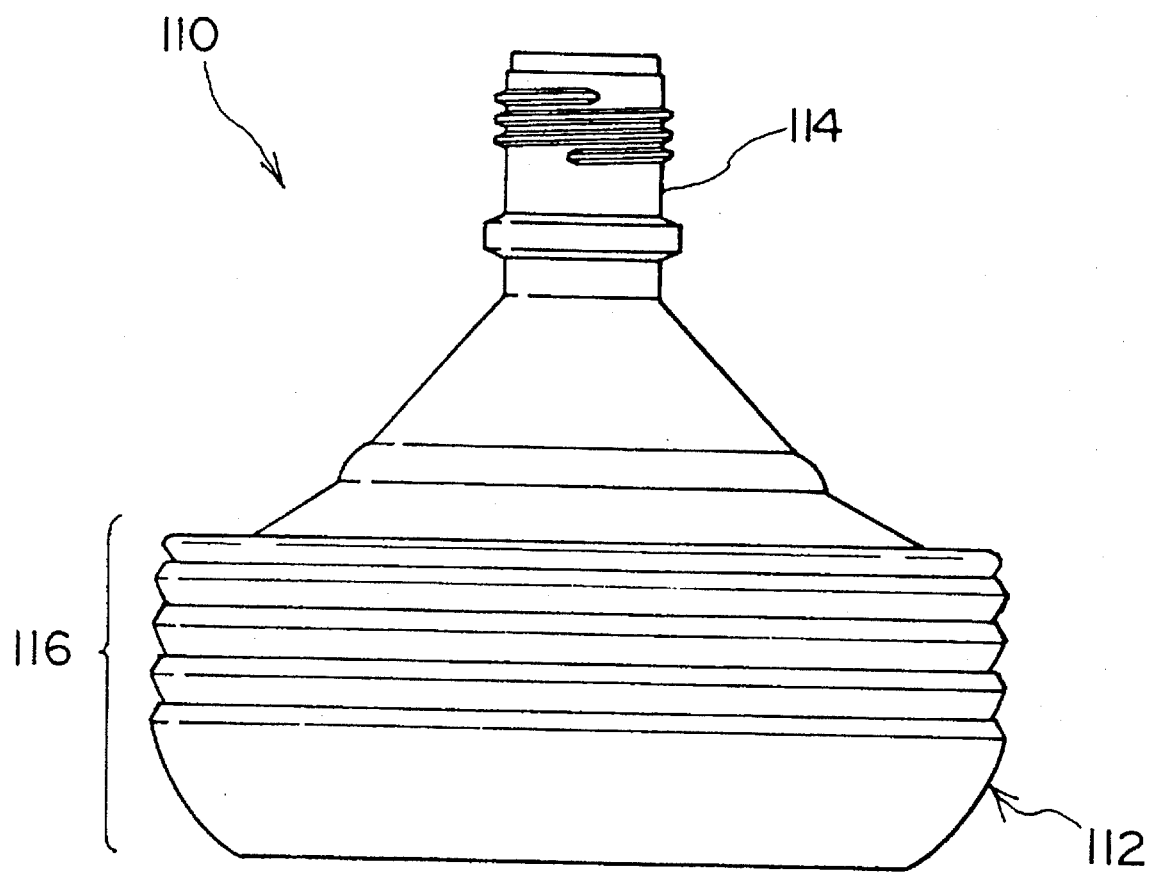
FIG. 17 is a front view illustrating the container for a photographic processing composition of FIG. 15 in a volume-reduced state.

It is desirable that the rate of volume reduction between the volume of the container for a photographic processing composition 110 in the state illustrated in FIG. 15 before the bellows portion 116 has been compressed to the volume of the container for a photographic processing composition 110 in the state illustrated in FIG. 17 in which the bellows portion 116 is completely compressed is less than or equal to 50%, preferably less than or equal to 40% and more preferably less that or equal to 30%. However, it is preferable that the rate of volume reduction is greater than or equal to 10% from the standpoints of manufacturing and design. Here, the rate of volume reduction has the same meaning as in the explanation of the first embodiment.

Next, a fifth embodiment of the present invention will be described with reference to FIGS. 18 and 19.

Figure 18:
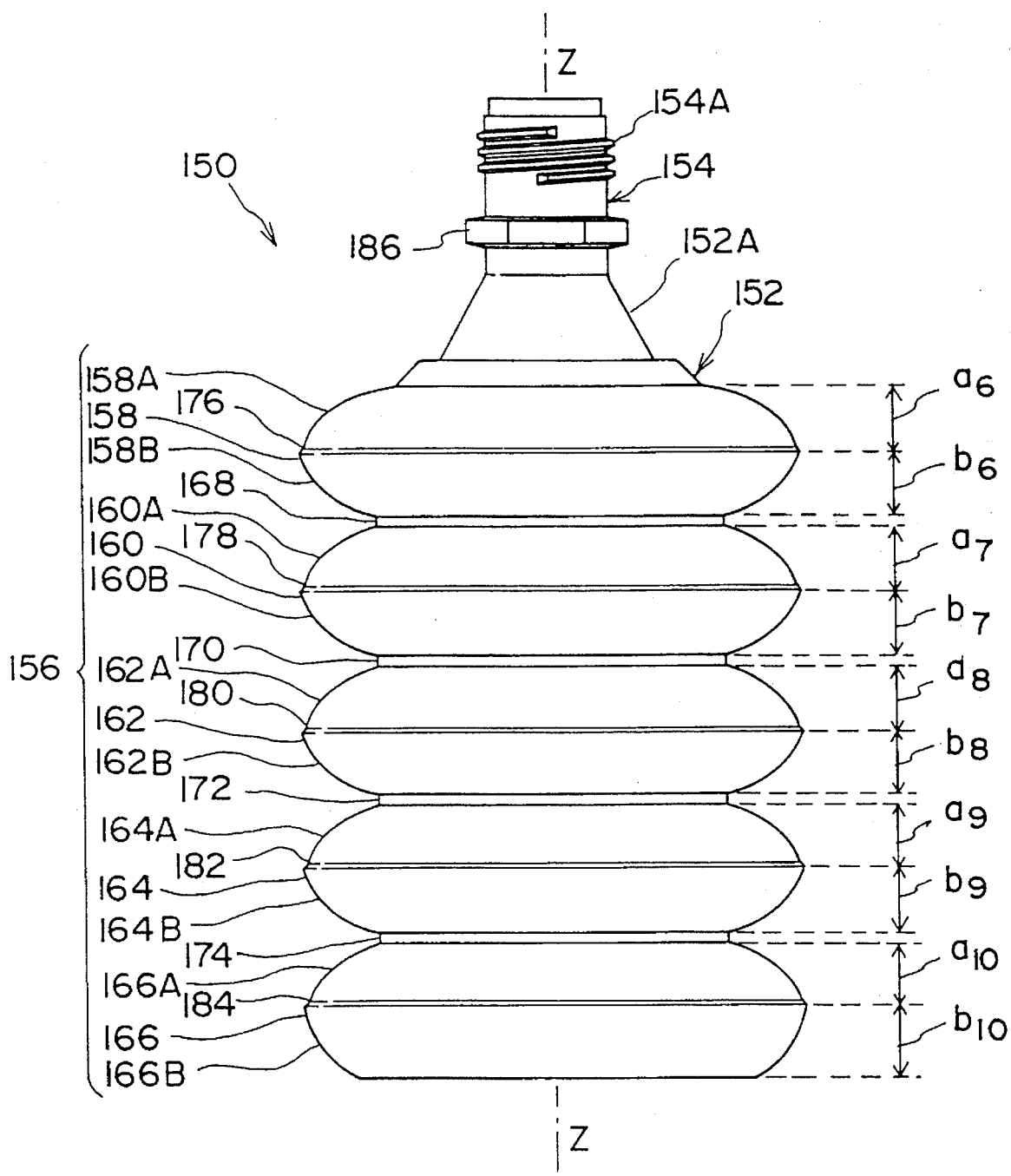
FIG. 18 is a front view of a container for a photographic processing composition relating to a fifth embodiment.
Figure 19:
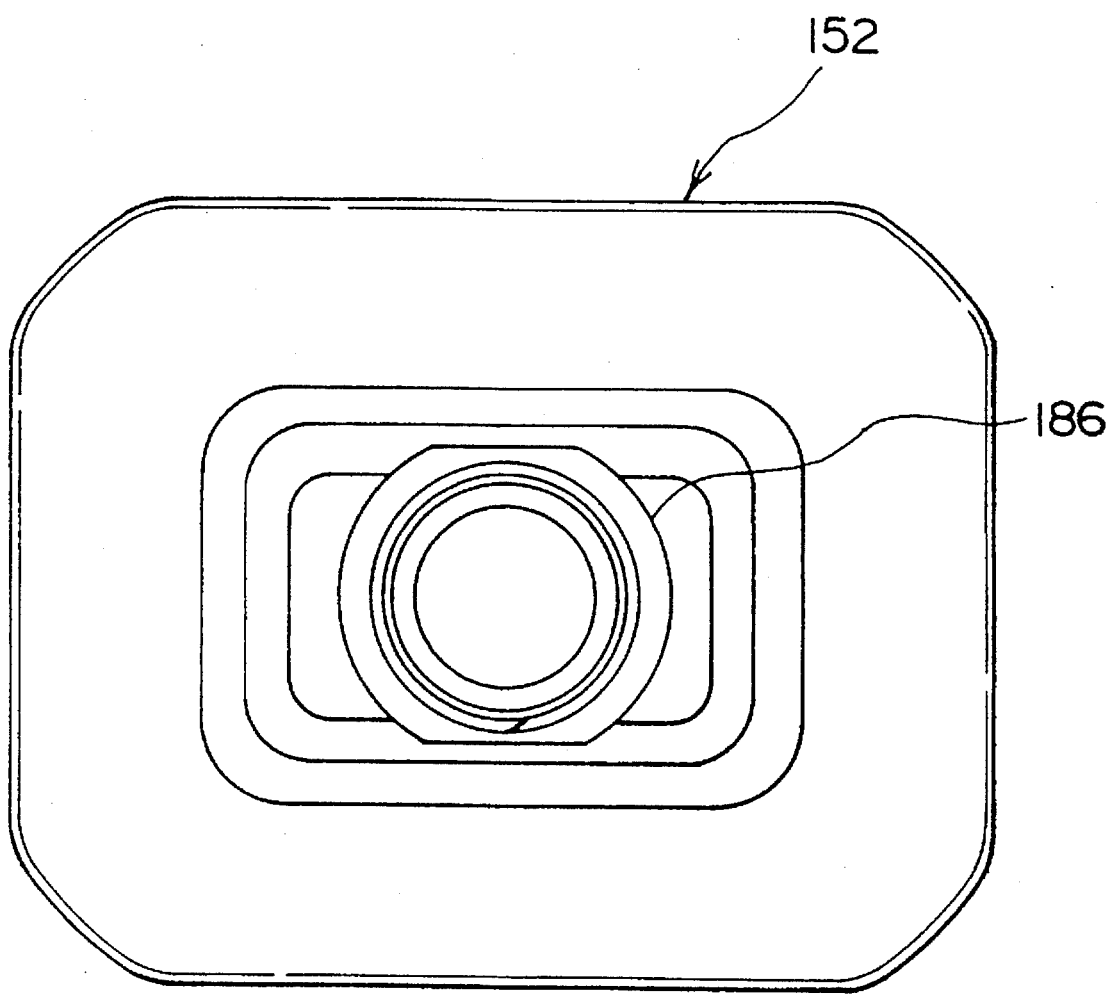
FIG. 19 is a plan view of FIG. 18.

In FIG. 18, a container for a photographic processing composition 150 relating to a fifth embodiment is illustrated.

The container for a photographic processing composition 150 has a flexible container main body 152 and a rigid opening portion 154 which protrudes upwardly from the container main body 152. The container main body 152 and the opening portion 154 are formed integrally by blow molding.

The cross sectional configuration of the container main body 152 is formed as an octagon (see FIG. 19) in which approximately the same triangular portion was removed from the four corners of a rectangle. A bellows portion 156 is formed beneath the connecting portion 152A (having a substantially rectangular pyramid shaped configuration), which connects with the opening portion 154, such that the bellows portion 156 is continuous to the bottom portion.

The bellows portion 156 has sixth, seventh, eighth, ninth and tenth annular convex portions 158, 160, 162, 164, 166, and fifth, sixth, seventh, and eighth annular connecting portions 168, 170, 172, 174. The sixth through the tenth annular convex portions 158 through 166 are disposed at predetermined intervals along the Z—Z axis. The fifth annular connecting portion 168 connects the sixth annular convex portion 158 and the seventh annular convex portion 160 at respective minimum protruding portions thereof which protrude the least in a direction orthogonal to the axis of both axial direction ends (the upper and lower ends in FIG. 18). The sixth annular connecting portion 170 connects the seventh annular convex portion 160 and the eighth annular convex portion 162 at respective minimum protruding portions thereof which protrude the least in the direction orthogonal to the axis. The seventh annular connecting portion 172 connects the eighth annular convex portion 162 and the ninth annular convex portion 164 at respective minimum protruding portions thereof which protrude the least in the direction orthogonal to the axis. The eighth annular connecting portion 174 connects the ninth annular convex portion 164 and the tenth annular convex portion 166 at respective minimum protruding portions thereof which protrude the least in the direction orthogonal to the axis.

The cross sectional configurations in the direction orthogonal to the axis of the sixth through the tenth annular convex portions 158 through 166 and the fifth through the eighth annular connecting portions 168 through 174 are each formed as an octagon (see FIG. 19) in which approximately the same triangular portion was removed from the four corners of a rectangle. Respective annular maximum protruding portions, which protrude from the Z—Z central axis by the greatest amount in the direction orthogonal to the axis, of the sixth, seventh, eighth, ninth and tenth annular convex portions 158, 160, 162, 164, 166 are provided at the respective intermediate portions of the sixth, seventh, eighth, ninth and tenth annular convex portions 158, 160, 162, 164, 166 in the axial direction (the vertical direction). As the respective annular maximum protruding portions have the same size and shape, they are set in a superposed arrangement when viewed from the axial direction. The axial direction dimensions of the respective portions of the sixth, seventh, eighth, ninth and tenth annular convex portions 158, 160, 162, 164, 166 below the respective annular maximum protruding portions thereof are substantially equal to the axial direction dimensions of the respective portions thereof above the annular maximum protruding portions. Namely, in FIG. 18, $a_6 \approx b_6$, $a_7 \approx b_7$, $a_8 \approx b_8$, $a_9 \approx b_9$, and $a_{10} \approx b_{10}$.

Further, relatively shallow eighth, ninth, tenth, eleventh and twelfth concave grooves 176, 178, 180, 182, 184 are formed above respective vicinities of the respective annular maximum protruding portions of the sixth, seventh, eighth, ninth and tenth annular convex portions 158, 160, 162, 164, 166 around the entire peripheries thereof.

R portions 158A, 158*6*, 160A, 160*6*, 162A, 162*6*, 164A, 164*6*, 166A, 166*6* are formed at the sixth, seventh, eighth, ninth and tenth annular convex portions 158, 160, 162, 164, 166 at portions above and below the respective annular maximum protruding portions thereof. The respective radii of curvature of the R portions 158A, 158*6*, 160A, 160*6*, 162A, 162*6*, 164A, 164*6*, 166A, 166*6* are substantially equal. The radii of curvature of the R portions above and below the annular maximum protruding portions may be different.

The radii of curvature of the R portions are greater than or equal to 5 mm, preferably 15 mm to 60 mm, and more preferably 15 mm to 40 mm.

From the standpoint of improving the collapsing efficiency, it is preferable that the maximum diameter of the fifth annular connecting portion 168 is less than or equal to 85%, preferably 40 to 75%, and more preferably 50 to 75% of the maximum diameter of the sixth annular convex portion 158, and that the same holds for the respective relations between the sixth annular connecting portion 170 and the seventh annular convex portion 160, and the seventh annular connecting portion 172 and the eighth annular convex portion 162, and the eighth annular connecting portion 174 and the ninth annular convex portion 164.

As can be clearly seen in FIG. 18, the lengths by which the fifth, sixth, seventh and eighth connecting portions 168, 170, 172 and 174 protrude from the central axis Z—Z in the direction orthogonal to the axis are smaller than the lengths by which the sixth, seventh, eighth, ninth and tenth annular convex portions 158, 160, 162, 164, 166 protrude from the central axis Z—Z in the direction orthogonal to the axis. Therefore, during blow molding by using a parison having a circular cross section, the fifth, sixth, seventh and eighth connecting portions 168, 170, 172 and 174 are formed so as to be somewhat more thick than the sixth, seventh, eighth, ninth and tenth annular convex portions 158, 160, 162, 164, 166. In the fifth embodiment, the respective portions forming the bellows portion 156 have the cross sectional configurations orthogonal to the axis as described above. Therefore, during blow molding, the resin easily bends in even at time four corner portions of the rectangle, and the thicknesses of the cross sections orthogonal to the axis become more uniform. During blow molding, so-called parison control may be effected by using a parison controller and dies of different shapes so that the thickness can be made even more uniform.

Similarly to the opening portion 14 of the first embodiment, the opening portion 154 is formed integrally with the container main body 152 by blow molding. At this time, the opening portion 154 is formed so as to be rigid to a certain extent. Further, the opening portion 154 is substantially cylindrical, and a flange portion 186 is formed at an intermediate portion thereof in the vertical (heightwise) direction. The cross sectional configuration of the flange portion 186 is formed as if both ends of a circle were cut in parallel so as to have the same chord length (see FIG. 19). It is preferable that the average thickness of the opening portion 154, the flange portion 186, the connecting portion 152A and the vicinity of these portions is 0.5 mm to 4 mm, more preferably 0.5 mm to 3 mm, and 1.2 mm to 2.5 mm is particularly preferable. The average thickness of the container main body 152 is preferably 0.1 mm to 1.5 mm, more preferably 0.2 mm to 0.5 mm, and 0.3 mm to 0.7 mm is particularly preferable. It is preferable that the difference between these average thicknesses is 0.2 mm, and more preferable that the difference is about 0.5 mm. Further, it is preferable that the ratio of the average thickness of the opening base and the average thickness of the main body is about 2.0 to 10.0.

Similarly to the opening portion 14 of the first embodiment, a male screw portion 154A is formed at the outer periphery of the upper end portion of the opening portion 154. A female screw portion which screws with the male screw portion 154A is formed on the inner wall of a cap (unillustrated) so that the cap screws with the outer periphery of the upper end portion of the opening portion 154.

The container for a photographic processing composition 150 is formed of the same material as the container for a liquid 10 of the first embodiment.

The operation and effects of the fifth embodiment are the same as or similar to those of the previously-described fourth embodiment. Further, in the fifth embodiment, as the thicknesses of the cross sections orthogonal to the axis of the respective portions forming the bellows portion 156 are almost exactly uniform along the entire periphery, it is even more difficult for the container for a photographic processing composition 150 to return to its original configuration after the volume of the container main body 152 has been reduced. Accordingly, the efficiency with which discarded containers for a photographic processing composition 150 are collected after use can be improved even more.

Figure 20:
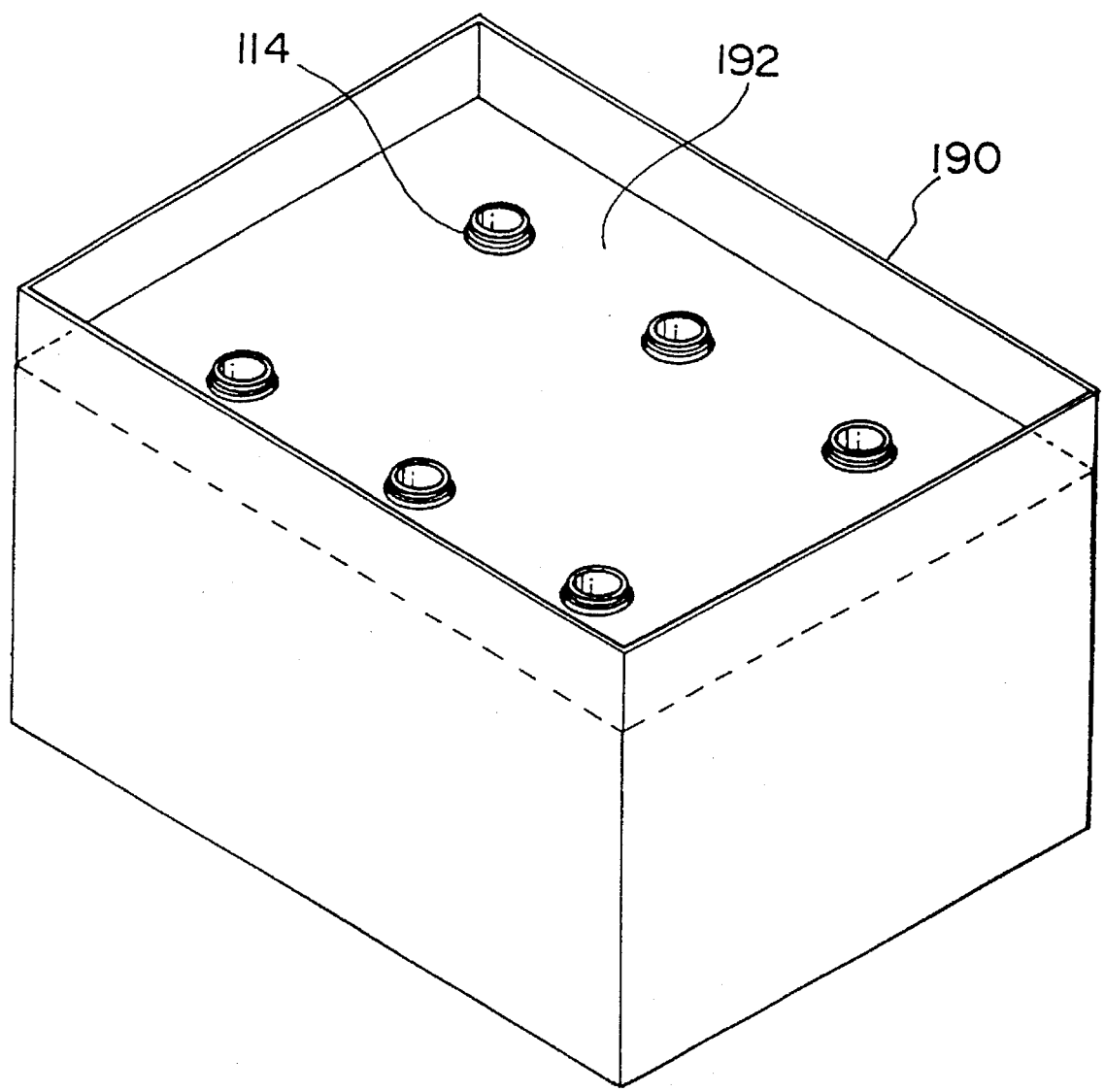
FIG. 20 is a view illustrating an example of preventing shifting when a plurality of the containers of FIG. 15 or FIG. 18 have been placed in a box.

When a plurality of (here, six) containers for a photographic processing composition 110 (or 150) which are filled with processing solution are packed into a single corrugated fiberboard box, a board 192 such as that illustrated in FIG. 20, in which a plurality of holes are formed so that the end portions of the container opening portions 114 (or 154) protrude therefrom, may be placed within a corrugated fiberboard box 190 so as to prevent the containers from shifting. Abrasion of the containers which occurs during transport thereof can thereby be controlled. The caps are unillustrated in FIG. 20.

In the first through the third embodiments, examples are illustrated in which the bellows portion has three levels or five levels of convex portions (abacus bead shaped portions). In the fourth and fifth embodiments, examples are illustrated in which the bellows portion has five levels of convex portions. The number of convex and concave portions forming the bellows portion is preferably 2 through 10, and more preferably 4 through 6. When there are few convex portions, the entire configuration nears a cylindrical shape, and the rate of increase of the specific surface area (using a cylindrical container of the same internal volume as a standard) can be reduced. This is preferable from the standpoint of reducing the oxygen transmission rate, and is suitable for the storing of developing solutions and the like. In particular, it is preferable that there are fewer convex portions when developing solutions are stored.

In the above-described embodiment, an example is described in which the container for a liquid relating to the present invention is filled with a processing solution (this will be described in further detail later) used in the developing processing of a photosensitive material. However, the container for a liquid can be used as a container for beverages which is filled with any of various of types of beverages. Further, in addition to being used for liquids such as aqueous solutions, the container for a liquid of the present invention can also be used for flowing substances such as mayonnaise, jam or the like, or for semi-flowing substances.

In the above-described embodiments, no mention is given of the internal volume of the container for a liquid. The present invention can be applied to containers of a wide range of internal volumes from 50 milliliters to several liters (more specifically, 2 to 5 liters for example).

Commonly-known processing chemicals for photography can be filled in the container for a liquid relating to the present invention. (Hereinafter, such chemicals will be referred to as chemicals to which "the present invention can be applied".) Color developing solutions, black-and-white developing solutions, bleaching solutions, fixing solutions, bleaching/fixing solutions, regulating solutions, stabilizers and the like can be given as examples of chemicals to which the present invention may be applied.

The color developing solution to which the present invention is applied is preferably an alkaline aqueous solution whose main component is an aromatic primary amine color developing agent. Aminophenol compounds may be used as the color developing agent, and p-phenylenediamine compounds are preferable. Typical examples include 3-methyl-4-amino-N,N-diethylaniline, 3-methyl-4-amino-N-ethyl-N-β-hydroxyethylaniline, 3-methyl-4-amino-N-ethyl-Nβ-methansulfonamideethylaniline, 3-methyl-4-amino-N-ethyl-N-β-methoxyethylaniline and their sulfates, hydrochloric acid salts or p-toluenesulfonic acid salts. Two or more of these compounds may be used together in accordance with the object thereof.

Color developing chemicals generally contain pH buffers such as carbonates, borates or phosphates of alkali metals; development inhibitors such as bromide salts, iodide salts, benzimidazoles, benzithiazoles, and mercapto compounds;

and antifoggants and the like. Further, the following can be used as occasion demands: preservatives such as hydrozylamine, diethylhydroxylamine, hydrazine sulfites, phenylsemicarbazides, triethanolamine, catecholsulfonic acids, triethylenediamine(1,4-diazabicyclo[2,2,2]octane) and the like; organic solvents such as ethylene glycol and diethylene glycol; development accelerators such as quaternary ammonium salts and amines; dye forming couplers, competitive couplers; fogging agents such as sodium borohydride; auxiliary developing agents such as 1-phenyl-3-pyrazolidone; thickening agents; various types of chelating agents such as aminopolycarboxylic acid, aminopolyphosphonic acid, alkylphosphonic acid, phosphonocarboxylic acid, and for example, ethylenediaminetetraacetic acid, nitrilotriacetic acid, diethylenetriaminopentaacetic acid, cyclohexanediaminetetraacetic acid, hydroxyethyliminodiacetic acid, 1-hydroxyethylidene-1-1-diphosphonic acid, nitrilo-N,N,N-trimethylenephosphonic acid, ethylenediamine-N,N,N',N'-tetramethylenephosphonic acid, ethylenediamine-di(o-hydroxyphenylacetic acid) and salts thereof.

Further, in black-and-white developing solution used in reversal processing, commonly-known black-and-white developing agents can be used alone, or combinations thereof can be used. Examples of commonly-known black-and-white developing agents include dihydroxybenzenes such as hydroquinone, 3-pyrazolidones such as 1-phenyl-3-pyrazolidone, aminophenols such as N-methyl-p-aminophenol, and the like.

Polyvalent metal compounds such as iron (III), peroxides, and the like can be used as a bleaching agent. Representative bleaching agents include organic complex salts of iron (III) (e.g., complex salts of aminopolycarboxylic acids such as ethylenediamine tetraacetate, diethylenetriamene pentaacetate, cyclohexanediamine tetraacetate, methyliminodiacetate, 1,3-diaminopropane tetraacetate, and glycoletherdiamine tetraacetate), persulfates, and the like. Aminopolycarboxylic acid iron (III) complex salt is particularly useful in bleaching solution and in bleaching/fixing solution.

Examples of fixing agents include thiosulfate, thiocyanate, thioether compounds, thioureas, a large amount of iodide salts, and the like. Usually thiosulfate is used, and ammonium thiosulfate in particular has the widest range of use. For bleaching/fixing solution preservatives, it is preferable to use sulfurous acid salt, bisulfite, sulfinic acids or carbonylbisulfite addition products.

Representative examples of processing solutions such as color developing solutions, bleaching/fixing solutions and the like to which the present invention may be applied are disclosed in "Photographic Industry Supplement: Handbook of the Latest Photographic Preparations" by Akira Sasai, (Photographic Industry Publishing Co., Jul. 20, 1983).

The following are specific examples of representative processing agents to which the present invention may be applied.

Color developing solutions, bleaching solutions, fixing solutions, and stabilizing solutions for color negative film disclosed in Japanese Patent Application Laid-Open No. 4-359249 (in particular, the color developing replenishing solution, the bleaching replenishing solution, the fixing replenishing solution and stabilizing solution No. 18 disclosed in the first embodiment) can be used. The solutions may be stored as they are in the container, or may be concentrated and then stored. For example, the above-mentioned stabilizing solution No. 18 may be concentrated 100 times.

Color developing solutions and bleaching/fixing solutions for color paper disclosed in Japanese Patent Application Laid-Open No. 4-195037 (in the embodiments, and in particular, the color developing replenishing solution and the bleaching/fixing replenishing solution disclosed in the second embodiment) can be used.

As for color developing solutions, bleaching/fixing solutions, and washing water for use with direct positive color photosensitive materials, the following can be used: the color developing replenishing solutions disclosed in Japanese Patent Application Laid-Open No. 1-93739 (those in the embodiments, and in particular, the color developing replenishing solutions disclosed in the second embodiment); the color developing replenishing solutions disclosed in Japanese Application Laid-Open No. 2-50157 (those in the embodiments, and in particular, the color developing replenishing solutions of the fourth embodiment, more particularly, CD-20); the color developing replenishing solutions disclosed in Japanese Patent Application Laid-Open No. 2-91642 (those in the embodiments, and in particular, the color developing replenishing solutions of the first embodiment, more particularly No. 6); bleaching/fixing solutions disclosed in Japanese Patent Application Laid-Open No. 3-13941 (those in the embodiments, and in particular, the bleaching/fixing solutions of the first embodiment); washing water disclosed in Japanese Patent Application Laid-Open No. 3-13941 (in particular, washing water disclosed in the first embodiment). These processing solutions may be stored as they are in the container, or may be concentrated and stored.

What is claimed is:

1. A container for a liquid comprising:

a flexible container main body having a bellows portion at at least an axial direction portion of said container main body; and a rigid opening portion formed integrally with said container main body so as to protrude from said container main body in an axial direction, wherein said bellows portion is formed of a plurality of annular convex portions which are disposed at predetermined intervals along the axial direction of said container main body, each of said annular convex portions having, at an intermediate portion thereof in the axial direction, an annular maximum protruding portion which protrudes a maximum amount from a central axis in a direction orthogonal to the axial direction, and wherein a cross section in a direction orthogonal to the axial direction of each of said annular convex portions is substantially rectangular, and said annular maximum protruding portions of said annular convex portions have a same size and a same configuration so as to be set in a superposed arrangement when viewed from the axial direction, and an axial direction dimension of one of an opening portion side of said annular maximum protruding portion and a side of said annular maximum protruding portion opposite to the opening portion side is greater than an axial direction dimension of the other one of the opening portion side of said annular maximum protruding portion and the side of said annular maximum protruding portion opposite to the opening portion side.

2. A container for a liquid according to claim 1, wherein an R portion is formed at each of said annular convex portions at one of one axial direction side of a vicinity of said annular maximum protruding portion and another axial direction side of the vicinity of said annular maximum protruding portion.

3. A container for a liquid according to claim 1, wherein R portions are formed at each of said annular convex portions at one axial direction side of a vicinity of said annular maximum protruding portion and at another axial direction side of the vicinity of said annular maximum protruding portion, respective radii of curvature of said R portions of said annular convex portion being different.

4. A container for liquid according to claim 1, wherein a concave groove is formed in each of said annular convex portions along an entire periphery of one axial direction side of said annular maximum protruding portion.

5. A container for a liquid comprising:

a flexible container main body having a bellows portion at at least an axial direction portion of said container main body; and a rigid opening portion formed integrally with said container main body so as to protrude from said container main body in an axial direction, wherein said bellows portion is formed of a plurality of annular convex portions and annular connecting portions, said plurality of annular convex portions being disposed at predetermined intervals along the axial direction of said container main body, said annular connecting portions connecting adjacent ones of said annular convex portions at minimum protruding portions which protrude a minimum amount in the direction orthogonal to the axial direction of both axial direction ends of said annular convex portions, and wherein a diameter of each of said annular connecting portions forming said bellows portion is no more than 85% of a maximum diameter of the annular convex portion at an opening portion side to which said annular connecting portion is connected whereby a collapsing efficiency of said bellows portion is improved.

6. A container for a photographic processing composition comprising:

a flexible container main body having a bellows portions at at least an axial direction portion of said container main body; and a rigid opening portion formed integrally with said container main body so as to protrude from said container main body in an axial direction, said opening portion being opened and closed by a lid member which engages with said opening portion, wherein said bellows portion is formed of a plurality of annular convex portions and band-shaped annular connecting portions, said plurality of annular convex portions having substantially rectangular cross sections orthogonal to the axial direction and being disposed at predetermined intervals along the axial direction of said container main body and respectively having, at an intermediate portion thereof in the axial direction, an annular maximum protruding portion which protrudes a maximum amount from a central axis in a direction orthogonal to the axial direction, and said band-shaped annular connecting portions connecting said annular convex portions, which are adjacent, at minimum protruding portions, which protrude a minimum amount in the direction orthogonal to the axial direction, of both axial direction ends of said annular convex portions, and wherein said annular maximum protruding portions of said annular convex port ions have a same size and a same configuration so as to be set in a superposed arrangement when viewed from the axial direction, and an axial direction dimension of one of an opening portion side of said annular maximum protruding portion and a side of said annular maximum protruding portion opposite to the opening portion side is greater than an axial direction dimension of the other one of the opening portion side of said annular maximum protruding portion and the side of said annular maximum protruding portion opposite to the opening portion side.

7. A container for a photographic processing composition according to claim 6, wherein R portions are formed at each of said annular convex portions at one axial direction side of a vicinity of said annular maximum protruding portion and at another axial direction side of the vicinity of said annular maximum protruding portion, a radius of curvature of an R portion at one side being less than a radius of curvature of an R portion at another side.

8. A container for a photographic processing composition according to claim 6, wherein a concave groove is formed in each of said annular convex portions along an entire periphery of one axial direction side of said annular maximum protruding portion.

* * * * *